(12) United States Patent
Tanaka et al.

(10) Patent No.: US 11,336,815 B2
(45) Date of Patent: May 17, 2022

(54) FOCUSING CONTROL DEVICE, FOCUSING CONTROL METHOD, AND PROGRAM

(71) Applicant: FUJIFILM Corporation, Tokyo (JP)

(72) Inventors: Koichi Tanaka, Saitama (JP); Kenkichi Hayashi, Saitama (JP); Akihiro Uchida, Saitama (JP); Seiichi Izawa, Saitama (JP); Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 64 days.

(21) Appl. No.: 17/030,312

(22) Filed: Sep. 23, 2020

(65) Prior Publication Data

US 2021/0006729 A1 Jan. 7, 2021

Related U.S. Application Data

(63) Continuation of application No. PCT/JP2018/045768, filed on Dec. 12, 2018.

(30) Foreign Application Priority Data

Mar. 30, 2018 (JP) .............................. JP2018-068990

(51) Int. Cl.
- *H04N 5/232* (2006.01)
- *G02B 7/09* (2021.01)
- *G02B 7/36* (2021.01)

(52) U.S. Cl.
CPC ......... *H04N 5/232123* (2018.08); *G02B 7/09* (2013.01); *G02B 7/36* (2013.01)

(58) Field of Classification Search
CPC ......... H04N 5/232123; H04N 5/23209; H04N 5/232127; G02B 7/09; G02B 7/36; G03B 13/36

See application file for complete search history.

(56) References Cited

U.S. PATENT DOCUMENTS

| 5,343,089 A | * | 8/1994 | Itakura | ................. | G11C 27/024 |
| | | | | | 327/94 |
| 8,717,490 B2 | | 5/2014 | Imamura | | |

(Continued)

FOREIGN PATENT DOCUMENTS

| CN | 101078852 | 11/2007 |
| CN | 101630109 | 1/2010 |

(Continued)

OTHER PUBLICATIONS

"International Search Report (Form PCT/ISA/210) of PCT/JP2018/045768," dated Mar. 19, 2019, with English translation thereof, pp. 1-3.

(Continued)

*Primary Examiner* — Gevell V Selby
(74) *Attorney, Agent, or Firm* — JCIPRNET

(57) ABSTRACT

A focusing control device that moves a position of a focus lens included in an imaging lens along an optical axis direction. The device comprises a processor configured to execute a process. The process comprises receiving an input of a captured image obtained by imaging an optical image passed through the imaging lens including the focus lens; performing one processing of first processing that includes deriving a contrast value of an image within a distance measurement area which changes according to the movement of the position of the focus lens for each of a plurality of the distance measurement areas, specifying a peak of the contrast value based on the contrast value for each of the plurality of distance measurement areas, and specifying, as a focusing position, the position of the focus lens corresponding to the specified peak of the contrast value, or second processing that includes specifying the peak of the contrast value based on an added value obtained by adding the contrast values derived from the plurality of distance measurement areas and specifying, as the focusing position, (Continued)

the position of the focus lens corresponding to the specified peak of the contrast value; performing control such that the one processing is switched according to an amount of change of a position of an image of a subject corresponding to a change of an image magnification of the imaging lens, and moving the focus lens to the specified focusing position.

10 Claims, 21 Drawing Sheets

(56) References Cited

U.S. PATENT DOCUMENTS

| | | | |
|---|---|---|---|
| 8,730,380 B2 | 5/2014 | Uchida | |
| 8,947,579 B2 | 2/2015 | Terashima et al. | |
| 9,444,994 B2 | 9/2016 | Ogasawara et al. | |
| 10,070,039 B2 | 9/2018 | Yoneyama | |
| 2003/0123870 A1* | 7/2003 | Yoshida | G02B 7/34 396/121 |
| 2008/0018777 A1 | 1/2008 | Higashino | |
| 2014/0204266 A1 | 7/2014 | Ito | |
| 2014/0218595 A1* | 8/2014 | Kanda | H04N 5/343 348/353 |
| 2016/0156833 A1 | 6/2016 | Tsuji | |

FOREIGN PATENT DOCUMENTS

| | | |
|---|---|---|
| CN | 101931752 | 12/2010 |
| CN | 102262334 | 11/2011 |
| CN | 103430073 | 12/2013 |
| CN | 104038689 | 9/2014 |
| CN | 105378534 | 3/2016 |
| JP | H07190718 | 7/1995 |
| JP | 2010250170 | 11/2010 |
| JP | 2013238746 | 11/2013 |
| JP | 2014006477 | 1/2014 |
| JP | 2014137583 | 7/2014 |

OTHER PUBLICATIONS

"Written Opinion of the International Searching Authority (Form PCT/ISA/237) of PCT/JP2018/045768," dated Mar. 19, 2019, with English translation thereof, pp. 1-7.

"Office Action of China Counterpart Application", dated Oct. 25, 2021, with English translation thereof, pp. 1-20.

* cited by examiner

FOCUSING CONTROL DEVICE, FOCUSING CONTROL METHOD, AND PROGRAM

CROSS-REFERENCE TO RELATED APPLICATIONS

This application is a continuation application of International Application No. PCT/JP2018/045768, filed Dec. 12, 2018, the disclosure of which is incorporated herein by reference in its entirety. Further, this application claims priority from Japanese Patent Application No. 2018-068990 filed on Mar. 30, 2018, the disclosures of which are incorporated herein by reference in its entirety.

BACKGROUND OF THE INVENTION

1. Technical Field

A technology of the present disclosure relates to a focusing control device, a focusing control method, and a program.

2. Description of the Related Art

In the related art, a technology of deciding a focusing position of a focus lens based on a peak of a contrast value detected from a change of a contrast value of an image within a distance measurement area provided within a captured image in an imaging device that performs autofocus by a so-called contrast autofocus (AF) method is disclosed (see, for example, JP2013-238746A).

SUMMARY

However, in the technology disclosed in JP2013-238746A, since a position of the image of the subject changes according to a change of an image magnification of the focus lens as the focus lens moves along an optical axis direction, the image of the subject may deviate within the distance measurement area. In a case where the autofocus is performed by using a result obtained by performing peak search of a contrast value for the image within the distance measurement area and the image of the subject deviates from within the distance measurement area, a proper focusing state is not achieved, and thus, there is a problem that the captured image is blurred.

The present disclosure has been made in consideration of the above circumstances, and an object of the present disclosure is to provide a focusing control device, a focusing control method, and a program capable of improving specification accuracy of a focusing position even though a position of an image of a subject changes according to a change of an image magnification of a focus lens.

In order to achieve the above object, there is provided a focusing control device of a first aspect of the present disclosure comprising an input unit that receives an input of a captured image obtained by imaging an optical image passed through an imaging lens including a focus lens, a movement unit that moves a position of the focus lens along an optical axis direction, a processing unit that performs any one processing of first processing of deriving a contrast value of an image within a distance measurement area which changes according to the movement of the position of the focus lens by the movement unit for each of a plurality of the distance measurement areas, specifying a peak of the contrast value based on the contrast value for each of the plurality of distance measurement areas, and specifying, as a focusing position, the position of the focus lens corresponding to the specified peak of the contrast value, or second processing of specifying the peak of the contrast value based on an added value obtained by adding the contrast values derived from the plurality of distance measurement areas and specifying, as the focusing position, the position of the focus lens corresponding to the specified peak of the contrast value, and a controller that performs control such that the one processing to be executed by the processing unit is switched according to an amount of change of a position of an image of a subject corresponding to a change of an image magnification of the imaging lens. The movement unit moves the focus lens to the focusing position specified by the processing unit.

According to a focusing control device of a second aspect, in the focusing control device of the first aspect, the controller derives the amount of change of the position of the image of the subject based on an amount of change of the image magnification, a position of the distance measurement area in the captured image, and a movement range of the focus lens that detects the peak.

According to a focusing control device of a third aspect, in the focusing control device of the first aspect or the second aspect, in a case where the second processing is performed, the processing unit decides the distance measurement areas to which the contrast value is added among the plurality of distance measurement areas based on an amount of change of the image magnification.

According to a focusing control device of a fourth aspect, in the focusing control device of any one aspect of the first aspect to the third aspect, the processing unit performs movement processing of moving a position of the distance measurement area according to the change of the image position of the subject included in the distance measurement area.

According to a focusing control device of a fifth aspect, the focusing control device of the fourth aspect further comprises an instruction unit that gives an instruction to execute the movement processing. In a case where the movement processing is executed according to the instruction of the instruction unit, the controller performs control such that the processing unit performs the first processing.

According to a focusing control device of a sixth aspect, in the focusing control device of the fifth aspect, the instruction unit gives the instruction to execute the movement processing according to at least one of an expected processing time expected to be required for the movement processing or a frame rate of the captured image.

According to a focusing control device of a seventh aspect, in the focusing control device of the sixth aspect, in a case where the movement processing is executed according to the instruction of the instruction unit, the controller derives the amount of change of the position of the image of the subject in an expected processing time expected to be required for deriving the changed position of the image of the subject.

According to a focusing control device of an eighth aspect, in the focusing control device of any one aspect of the first aspect to the seventh aspect, the controller performs control such that the one processing is switched after the focus lens is moved by the movement unit in order to detect a change of the peak of the contrast value.

A focusing control method of a ninth aspect is a focusing control method of a focusing control device including a movement unit that moves a position of a focus lens included in an imaging lens along an optical axis direction. The method comprises receiving an input of a captured image obtained by imaging an optical image passed through the imaging lens, performing any one processing of first processing of deriving a contrast value of an image within a distance measurement area which changes according to the movement of the position of the focus lens by the movement unit for each of a plurality of the distance measurement areas, specifying a peak of the contrast value based on the contrast value for each of the plurality of distance measurement areas, and specifying, as a focusing position, the position of the focus lens corresponding to the specified peak of the contrast value, or second processing of specifying the peak of the contrast value based on an added value obtained by adding the contrast values derived from the plurality of distance measurement areas and specifying, as the focusing position, a position of the focus lens corresponding to the specified peak of the contrast value; performing control such that the one processing is switched according to an amount of change of a position of an image of a subject corresponding to a change of an image magnification of the imaging lens, and moving, by the movement unit, the focus lens to the specified focusing position.

A program of a tenth aspect is a program causing a computer that controls a focusing control device including a movement unit which moves a position of a focus lens included in an imaging lens along an optical axis direction to execute a process. The process comprises receiving an input of a captured image obtained by imaging an optical image passed through the imaging lens, performing any one processing of first processing of deriving a contrast value of an image within a distance measurement area which changes according to the movement of the position of the focus lens by the movement unit for each of a plurality of the distance measurement areas, specifying a peak of the contrast value based on the contrast value for each of the plurality of distance measurement areas, and specifying, as a focusing position, the position of the focus lens corresponding to the specified peak of the contrast value, or second processing of specifying the peak of the contrast value based on an added value obtained by adding the contrast values derived from the plurality of distance measurement areas and specifying, as the focusing position, a position of the focus lens corresponding to the specified peak of the contrast value; performing control such that the one processing is switched according to an amount of change of a position of an image of a subject corresponding to a change of an image magnification of the imaging lens, and moving, by the movement unit, the focus lens to the specified focusing position.

Accordingly, according to the present disclosure, even though the position of the image of the subject changes according to the change of the image magnification of the focus lens it is possible to improve the specification accuracy of the focusing position.

BRIEF DESCRIPTION OF THE DRAWINGS

Exemplary embodiments according to the technique of the present disclosure will be described in detail based on the following figures, wherein.

DETAILED DESCRIPTION

Hereinafter, exemplary embodiments for carrying out a technology of the present disclosure will be described in detail with reference to the drawings.

First Embodiment

Figure 1:
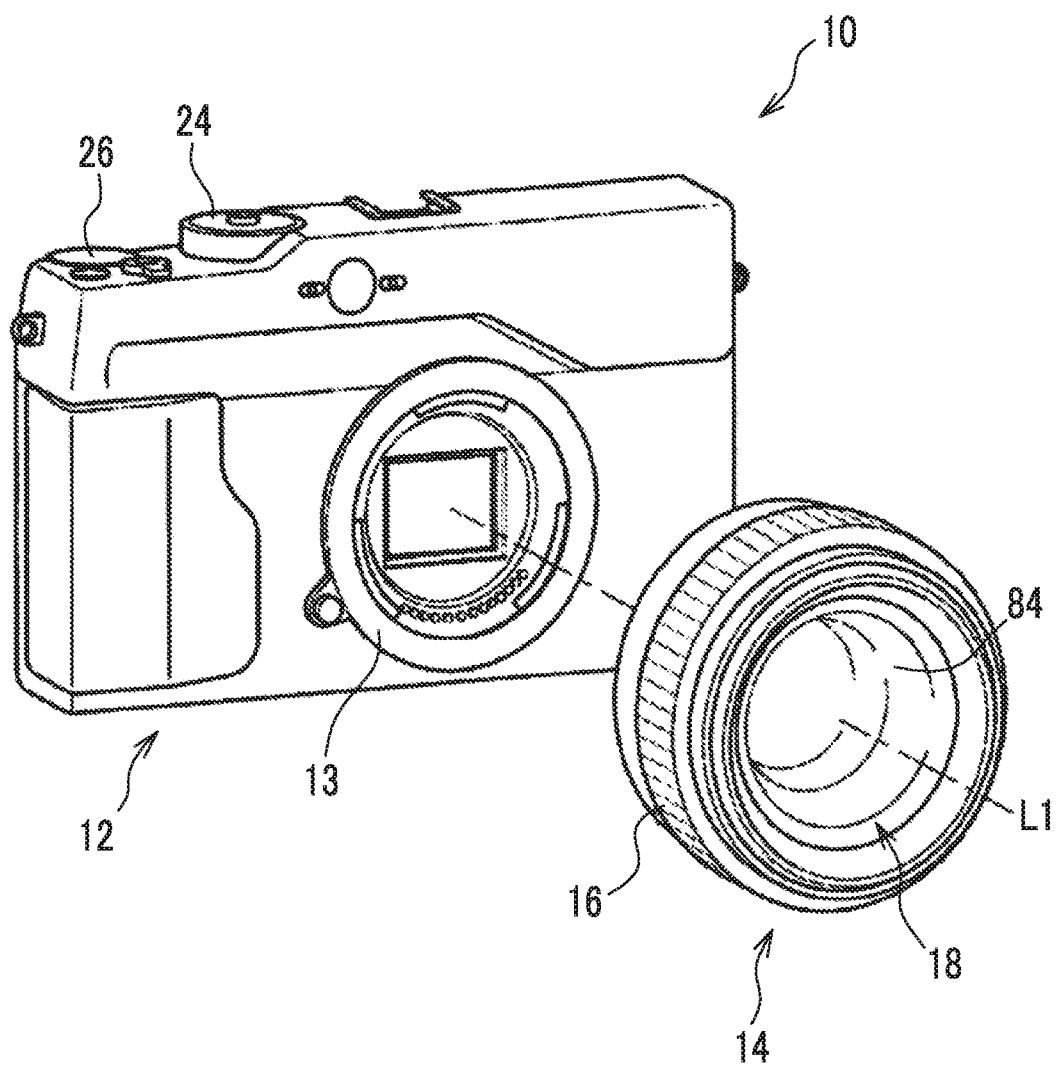
FIG. 1 is a perspective view showing an example of an external appearance of an imaging device according to an embodiment.

First, an example of a configuration of an imaging device 10 according to the present embodiment will be described. For example, as shown in FIG. 1, the imaging device 10 of the present embodiment is a lens-interchangeable digital camera, and includes an imaging device main body 12 and an imaging lens 14.

The imaging lens 14 is exchangeably attached to the imaging device main body 12. A focus ring 16 used in a manual focus mode is provided at a lens barrel of the imaging lens 14. The imaging lens 14 includes a lens unit 18.

The lens unit 18 is a combination lens in which a plurality of lenses including a focus lens 84 is combined. The focus lens 84 moves along a direction of an optical axis L1 as the focus ring 16 is manually rotated. The focus lens 84 is stopped at a focusing position corresponding to a subject distance. Subject light which is reflected light indicating a subject is transmitted through the lens unit 18 including the focus lens 84, and an image is formed on a light reception surface 22A (see FIG. 3) of an imaging element 22 to be described later. The "subject distance" is a distance from the light reception surface 22A to the subject.

A dial 24 and a release button 26 are provided on an upper surface of the imaging device main body 12. The dial 24 is operated in various settings such as switching between an imaging mode and a playback mode. Thus, in the imaging device 10, a user operates the dial 24, and thus, the imaging mode and the playback mode are selectively set as operation modes.

The imaging device 10 has a still image imaging mode and a motion picture imaging mode as operation modes of an imaging system. The still image imaging mode is an operation mode in which a still image obtained by imaging the subject by the imaging device 10 is recorded, and the motion picture imaging mode is an operation mode in which a motion picture obtained by imaging the subject by the imaging device 10 is recorded. In the present embodiment, in a case where the still image and the motion picture are collectively referred to without being distinguished, these images are simply referred to as a "captured image".

The release button 26 is configured to be able to detect a two-step pushing operation of an imaging preparation instruction state and an imaging instruction state. The imaging preparation instruction state refers to, for example, a state of being pushed from a standby position to an intermediate position (half-pushing position), and the imaging instruction state is a state of being pushed to a final pushing position (full-pushing position) beyond the intermediate position. Hereinafter, the "state of being pushed from the standby position to the half-pushing position" is referred to as a "half-pushing state", and the "state of being pushed from the standby position to the fully-pushing position" is referred to as a "full-pushing state".

In an autofocus mode, an imaging condition is adjusted by pressing the release button 26 up to the half-pushing state, and then a main exposure is performed by subsequently pushing the release button up to the fully-pushing state. That is, after an auto exposure (AE) function works and an expose amount state is set by pushing the release button 26 to the half-pushing state, an autofocus (AF) function works, and focusing is controlled. Thereafter, imaging is performed by pushing the release button 26 up to the fully-pushing state.

Figure 2:
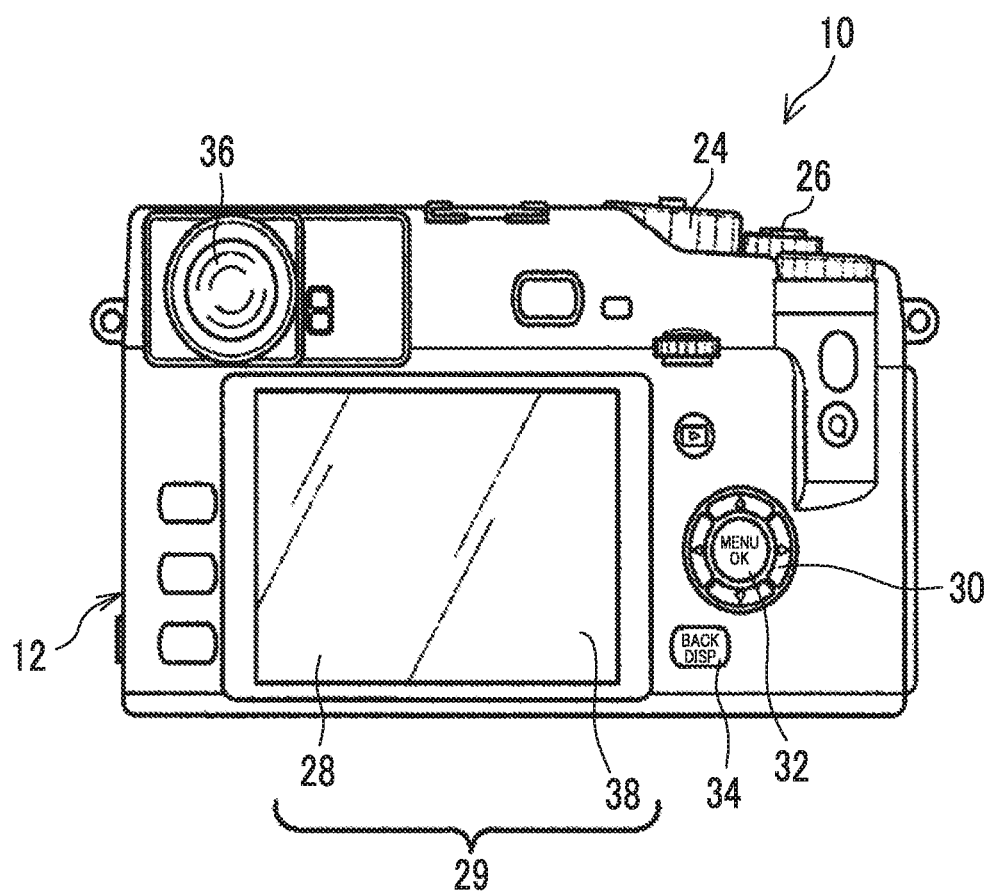
FIG. 2 is a rear view showing an example of an outer appearance of a rear side of the imaging device of the embodiment.

For example, as shown in FIG. 2, a display 28, a cross key 30, a MENU/OK key 32, a BACK/DISP button 34, a finder 36, and a touch panel 38 are provided on a rear surface of the imaging device main body 12.

The display 28 is, for example, a liquid crystal display (LCD), and displays an image and text obtained by imaging the subject by the imaging device 10. The display 28 of the present embodiment is a touch panel display 29 by cooperating with the touch panel 38. The display 28 is used to display a live view image in the imaging mode. The live view image is also referred to as a through-image, and is a continuous frame image obtained by imaging the subject in continuous frames by the imaging element 22 of the imaging device 10. The "captured image" includes the live view image.

The display 28 is also used to display the still image obtained by imaging a single frame in a case where an instruction to image the still image is given. The display 28 is used to display a reproduction image in the playback mode and display a menu screen.

A transparent touch panel 38 is overlaid on a surface of a display area of the display 28. The touch panel 38 detects, for example, a touch of a finger or an instructor such as a stylus pen. The touch panel 38 outputs detection result information indicating a detection result of whether or not the touch panel 38 is touched by the instructor to a predetermined output destination (for example, a central processing unit (CPU) 74 to be described later, see FIG. 3) at a predetermined cycle (for example, 100 milliseconds). The detection result information includes two-dimensional coordinates (hereinafter, referred to as "coordinates") capable of specifying a touch position of the instructor on the touch panel 38 in a case where the touch panel 38 detects the touch of the instructor, and does not include the coordinates in a case where the touch panel 38 does not detect the touch of the instructor.

The cross key 30 functions as a multifunction key which outputs an instruction content signal according to various instructions such as selection of one or a plurality of menus, zooming, or frame advance. The MENU/OK key 32 is an operation key having both a function as a menu (MENU) button and a function as a permission (OK) button. The function as the menu (MENU) button is a function of giving an instruction to display one or a plurality of menus on a screen of the display 28. The function as the permission (OK) button is a function of instructing confirmation and execution of the selected content. The BACK/DISP button 34 is used to delete a desired target such as a selection item, cancel a designated content, or return to the previous operation state.

Figure 3:
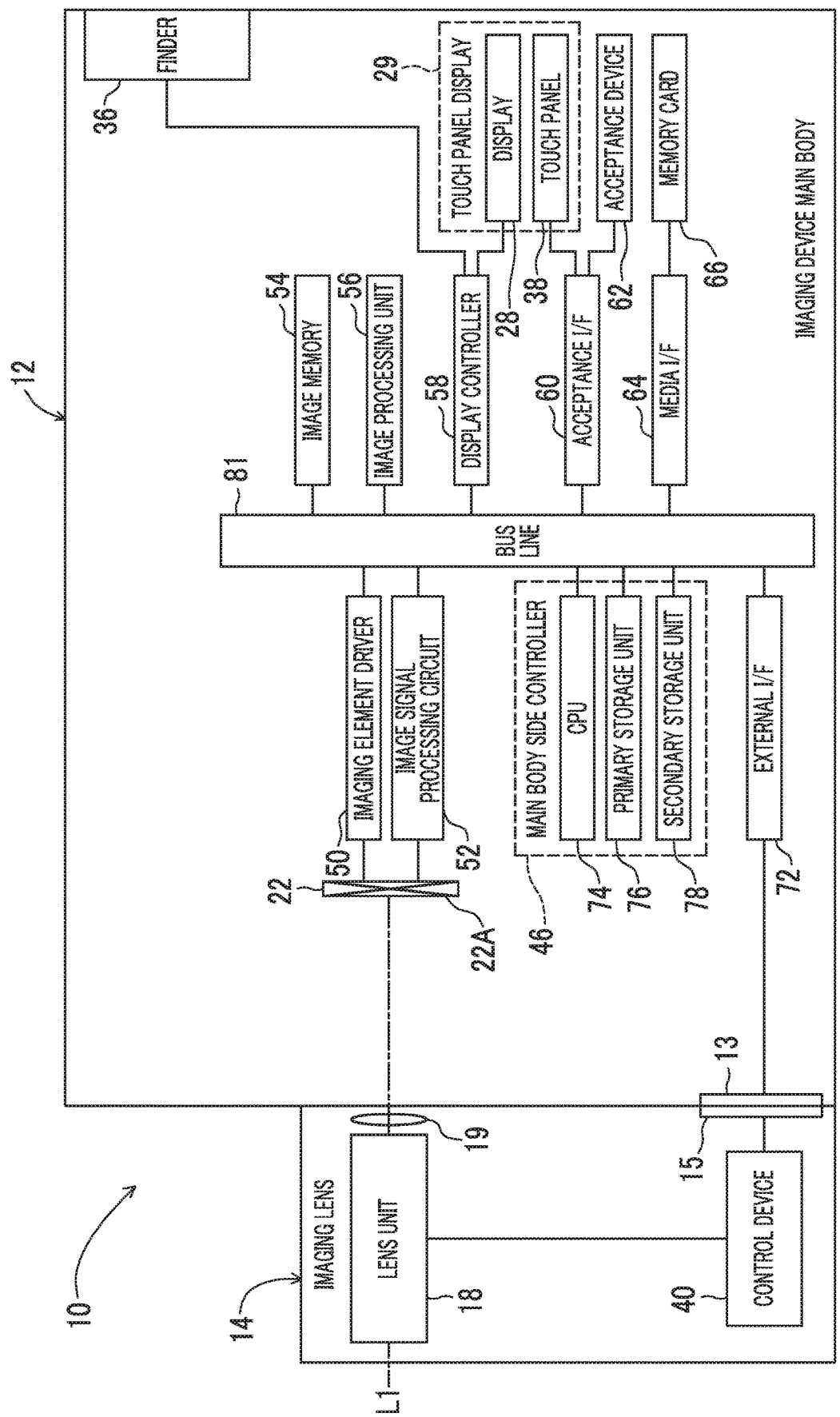
FIG. 3 is a block diagram showing an example of a hardware configuration of the imaging device of the embodiment.
Figure 4:
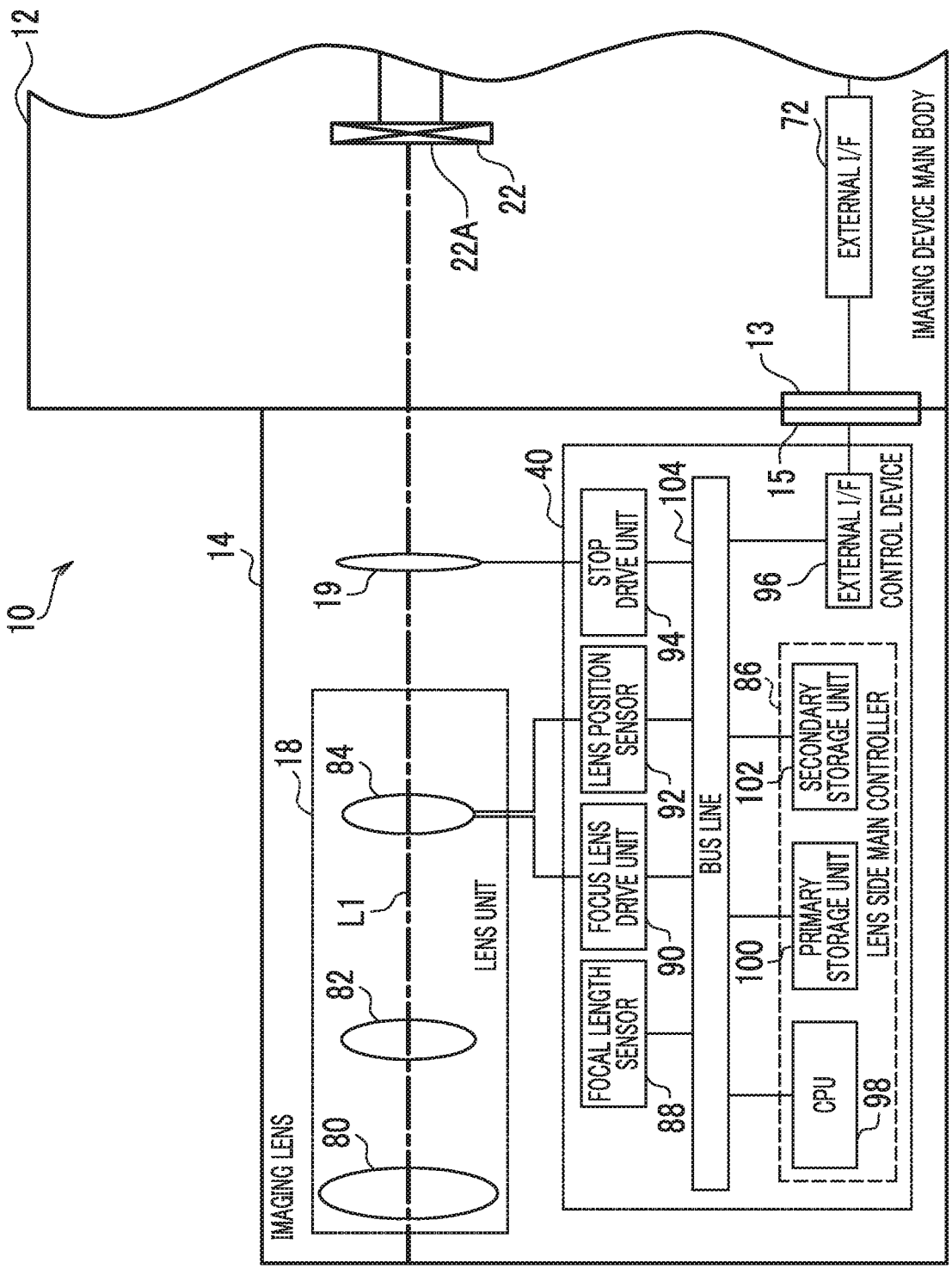
FIG. 4 is a block diagram showing an example of a hardware configuration of an imaging lens included in the imaging device of the embodiment.

FIG. 3 is a block diagram showing an example of a hardware configuration of the imaging device 10 of the present embodiment. FIG. 4 is a block diagram showing an example of a hardware configuration of the imaging lens 14 included in the imaging device 10 of the present embodiment.

As shown in FIG. 3, the imaging device main body 12 of the present embodiment includes a mount 13 (see FIG. 1), and the imaging lens 14 comprises a mount 15. The imaging lens 14 is replaceably attached to the imaging device main body 12 by coupling the mount 15 to the mount 13.

The imaging lens 14 includes a stop 19 and a control device 40 in addition to the lens unit 18. The mount 15 is connected to the mount 13, and thus, the control device 40 is electrically connected to the CPU 74 via an external interface (I/F) 72 of the imaging device main body 12. The entire imaging lens 14 is controlled according to an instruction of the CPU 74.

As shown in FIG. 4, the lens unit 18 of the present embodiment includes an incidence lens 80, a zoom lens 82, and the focus lens 84. The incidence lens 80, the zoom lens 82, and the focus lens 84 are arranged along the optical axis L1, and the focus lens 84, the zoom lens 82, and the incidence lens 80 are arranged in this order from the stop 19 side along the optical axis L1.

The subject light is incident on the incidence lens 80. The incidence lens 80 transmits the subject light, and guides the subject light to the zoom lens 82. The zoom lens 82 of the present embodiment includes a plurality of lenses capable of moving along the optical axis L1. A focal length of the imaging lens 14 (hereinafter, simply referred to as a "focal length") is adjusted by the position of the zoom lens 82. Specifically, a positional relationship between the lenses along the optical axis L1 is adjusted by moving each lens of the zoom lens 82 closer or farther along the optical axis L1 by a zoom operation via the cross key 30, and the focal length is adjusted. The zoom lens 82 transmits the subject light incident from the incidence lens 80, and guides the subject light to the focus lens 84.

The focus lens 84 is a lens movable along the optical axis L1, and changes a focusing state of a subject image formed on the light reception surface 22A of the imaging element 22 by moving along the optical axis L1. The focus lens 84 transmits the subject light incident from the zoom lens 82, and guides the subject light to the stop 19. The stop 19 adjusts a light amount of the subject light transmitted through the lens unit 18, and guides the subject light to the imaging device main body 12.

The control device 40 of the imaging lens 14 includes a lens side main controller 86, a focal length sensor 88, a focus lens drive unit 90, a lens position sensor 92, a stop drive unit 94, and an external I/F 96. The focus lens drive unit is also called as "focus lens driver". And the stop drive unit is also called as "aperture stop driver".

The lens side main controller 86 comprises a CPU 98, a primary storage unit 100, and a secondary storage unit 102. The CPU 98 controls the entire imaging lens 14. The primary storage unit 100 is a volatile memory used as a work area in executing various programs. A random access memory (RAM) is an example of the primary storage unit 100. The secondary storage unit 102 is a non-volatile memory that stores various programs and various parameters in advance. An example of the secondary storage unit 102 is an electrically erasable programmable read-only memory (EEPROM) or a flash memory.

The CPU 98, the primary storage unit 100, and the secondary storage unit 102 are connected to a bus line 104. The focal length sensor 88, the focus lens drive unit 90, the lens position sensor 92, the stop drive unit 94, and the external I/F 96 are also connected to the bus line 104.

The external I/F 96 is connected to the external I/F 72 of the imaging device main body 12 by connecting the mount 13 to the mount 15. The external I/F 96 transmits and receives various kinds of information between the CPU 98 and the CPU 74 of the imaging device main body 12 by cooperating with the external I/F 72.

The focal length sensor 88 detects a state of the zoom lens 82 from the amount of zoom operation via the cross key 30, and converts the detected state of the zoom lens 82 into a focal length. The focal length sensor 88 outputs focal length information indicating the converted focal length to the CPU 98.

The focus lens drive unit 90 includes a focus lens drive motor (not shown). The focus lens drive unit 90 of the present embodiment is an example of a movement unit of the present disclosure. The focus lens drive unit 90 moves the focus lens 84 along the optical axis L1 by moving the focus lens drive motor in response to a drive pulse under the control of the CPU 98 according to an instruction received by an acceptance device 62 (see FIG. 3). That is, the focus lens drive unit 90 moves the focus lens 84 along the optical axis L1 by operating the focus lens drive motor according to an instruction from the CPU 98 and transmitting a power of the focus lens drive motor to the focus lens 84. The lens position sensor 92 detects a position of the focus lens 84 along the optical axis L1 (hereinafter, simply referred to as a "position of the focus lens 84"), and outputs lens position information indicating the detected position to the CPU 98.

The stop drive unit 94 includes a stop drive motor (not shown). The stop drive unit 94 adjusts a size of an opening of the stop 19 by operating the stop drive motor under the control of the CPU 98 according to an instruction accepted by the acceptance device 62.

Figure 5:
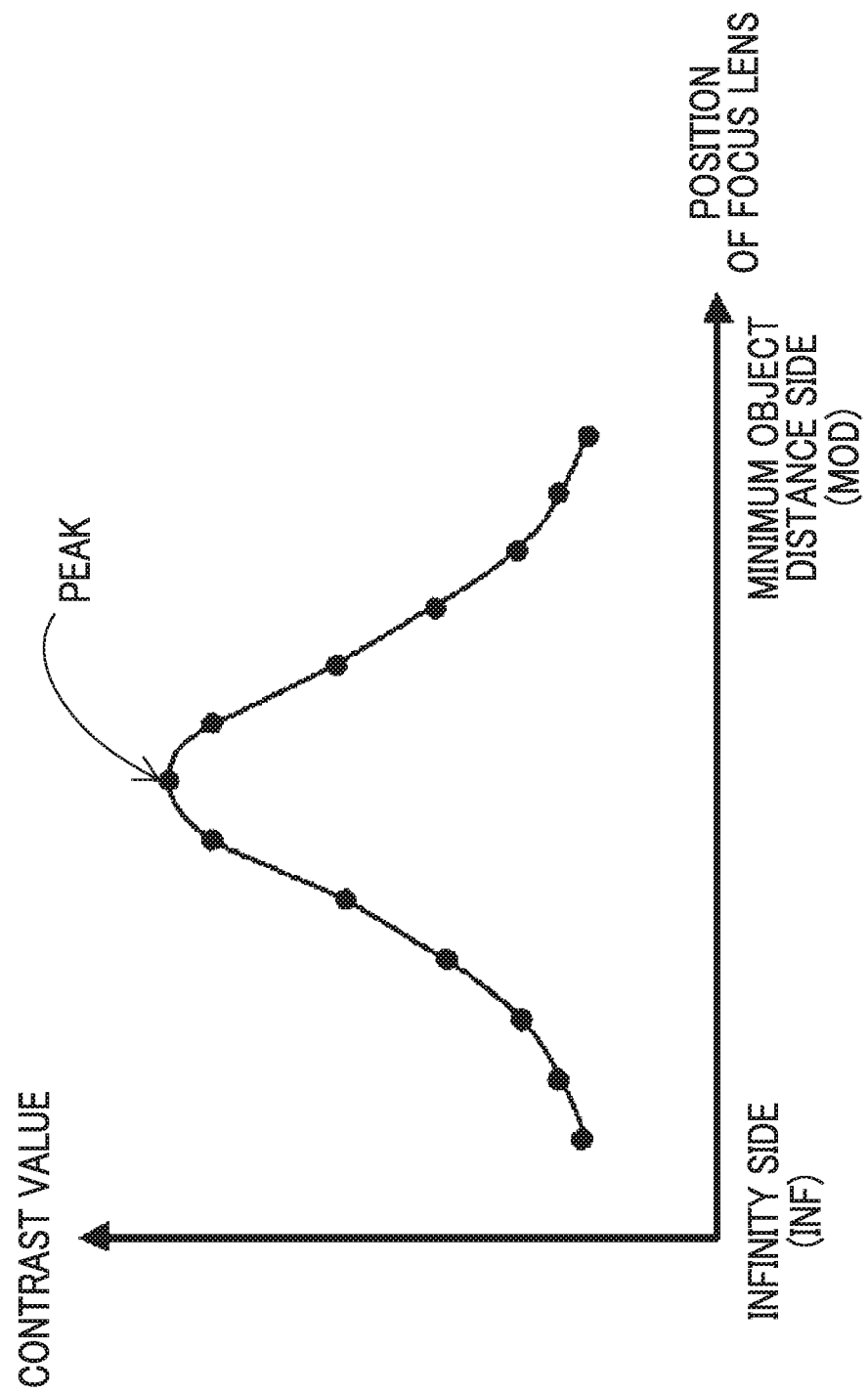
FIG. 5 is a graph for describing autofocus of the embodiment.

The imaging device 10 of the present embodiment performs autofocus for controlling the focusing state by a so-called contrast AF method. Specifically, for example, as shown in FIG. 5, the imaging device 10 of the present embodiment derives contrast values of the captured image at a plurality of different positions while moving the position of the focus lens 84 along the optical axis L1 in a range between an infinity (INF) side and a minimum object distance (MOD) side. The focus lens drive unit 90 of the imaging device 10 controls the focusing state (hereinafter, referred to as "focusing control") by moving the focus lens 84 to a position at which the derived contrast value has a peak value. In the present embodiment, a contrast value of the image within a distance measurement area (to be described later in detail) in the captured image is applied as the contrast value. In the imaging device 10 of the present embodiment, in a case where the focusing control is performed, a plurality of distance measurement areas is set within the captured image (details will be described later).

Figure 6:
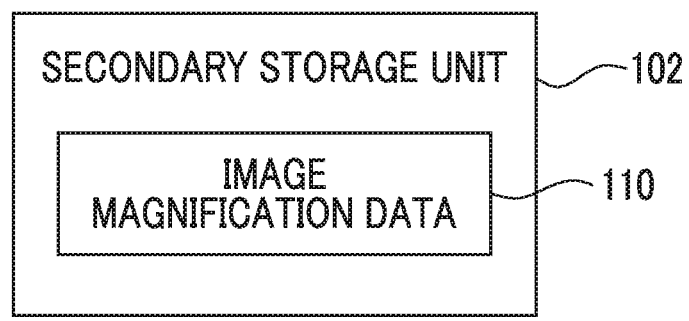
FIG. 6 is a conceptual diagram showing an example of contents stored in a secondary storage unit of a lens main controller included in the imaging lens of the imaging device.

In the present embodiment, for example, image magnification data 110 indicating an image magnification of the focus lens 84 is stored in advance in the secondary storage unit 102 of the lens side main controller 86 as shown in FIG. 6. The image magnification of the focus lens 84 varies depending on a type of the focus lens, and may vary depending on the position of the focus lens 84. As described above, in a case where the image magnification varies depending on the position of the focus lens 84, the image magnification data 110 is information indicating a correspondence between the position of the focus lens 84 and the image magnification. Although the image magnification is actually decided by the imaging lens 14, more specifically, the entire lens unit 18, since the image magnification changes by the movement of the focus lens 84, the image magnification may also be referred to as the "image magnification of the focus lens 84". In some types of the focus lens 84, the image magnification is constant and is not changed regardless of the position of the focus lens 84. In this case, the image magnification data 110 is information indicating the image magnification (constant value) of the focus lens 84.

Meanwhile, as shown in FIG. 3, the imaging device main body 12 of the present embodiment includes the imaging element 22, a main body side main controller 46, an imaging element driver 50, an image signal processing circuit 52, an image memory 54, an image processing unit 56, and a display controller 58. The imaging device main body 12 includes an acceptance I/F 60, the acceptance device 62, a media I/F 64, and the external I/F 72.

Figure 7:
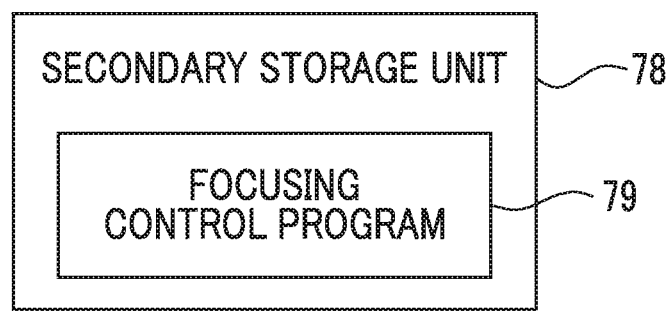
FIG. 7 is a conceptual diagram showing an example of contents stored in a secondary storage unit of a main body side main controller included in an imaging device main body of the embodiment.

The main body side main controller 46 is an example of a computer according to the technology of the present disclosure, and comprises the CPU 74, a primary storage unit 76, and a secondary storage unit 78. The CPU 74 controls the entire imaging device 10. The primary storage unit 76 is a volatile memory used as a work area in executing various programs. An example of the primary storage unit 76 is a RAM. As shown in FIG. 7, the secondary storage unit 78 of the present embodiment is a non-volatile memory that stores various programs including a focusing control program 79 and various parameters in advance. An example of the secondary storage unit 78 is an EEPROM or a flash memory.

The CPU 74 reads out the focusing control program 79 from the secondary storage unit 78, loads the focusing control program into the primary storage unit 76, and executes focusing control processing which will be described in detail later according to the loaded focusing control program 79. In other words, the CPU 74 operates as an input unit, a processing unit, and a controller of the present disclosure by executing the focusing control program 79. The focusing control program 79 of the present embodiment is an example of the program of the present disclosure.

The CPU 74, the primary storage unit 76, and the secondary storage unit 78 are connected to a bus line 81. The imaging element driver 50 and the image signal processing circuit 52 are also connected to the bus line 81. The image memory 54, the image processing unit 56, the display controller 58, the acceptance I/F 60, the media I/F 64, and the external I/F 72 are also connected to the bus line 81.

The imaging element driver 50 is connected to the imaging element 22. The imaging element driver 50 controls an operation of the imaging element 22. In the present embodiment, a charge coupled device (CCD) image sensor is used as the imaging element 22. However, the technology of the present disclosure is not limited thereto, and the imaging element 22 may be another image sensor such as a complementary metal-oxide-semiconductor (CMOS) image sensor.

The image signal processing circuit 52 reads out an image signal for one frame from the imaging element 22 for each pixel according to a horizontal synchronization signal. The image signal processing circuit 52 performs various kinds of processing such as sampling two correlation pile processing, automatic gain adjustment, and analog/digital (A/D) conversion on the readout image signal. The image signal processing circuit 52 outputs the image signal digitized by performing various kinds of processing on the image signal to the image memory 54 at a specific frame rate (for example, several tens of frames/second) defined by a clock signal supplied from the CPU 74 for each frame. The image memory 54 temporarily retains the image signal input from the image signal processing circuit 52.

The image processing unit 56 acquires the image signal for each frame from the image memory 54 at a specific frame rate, and performs various kinds of processing such as gamma correction, luminance conversion, color difference conversion, and compression processing on the acquired image signal. The image processing unit 56 outputs the image signal obtained by performing various kinds of processing to the display controller 58 for each frame at a specific frame rate. The image processing unit 56 outputs the image signal obtained by performing various kinds of processing to the CPU 74 according to a request from the CPU 74.

The display controller 58 is connected to the display 28 of the touch panel display 29 and the finder 36, and controls the display 28 and the finder 36 under the control of the CPU 74. The display controller 58 outputs the image signal input from the image processing unit 56 to the display 28 and the finder 36 at a specific frame rate for each frame.

The display 28 displays the image indicated by the image signal input from the display controller 58 at a specific frame rate as the live view image. The display 28 also displays a still image that is a single frame image captured in a single frame. In addition to the live view image, the display 28 displays the reproduction image and the menu screen. The finder 36 is a so-called electronic viewfinder, and displays the image indicated by the image signal input from the display controller 58 at a specific frame rate as the live view image, similarly to the display 28.

The acceptance device 62 includes the dial 24, the release button 26, the cross key 30, the MENU/OK key 32, and the BACK/DISP button 34, and accepts various instructions from the user.

The touch panel 38 of the touch panel display 29 and the acceptance device 62 are connected to the acceptance I/F 60, and output an instruction content signal indicating the content of the accepted instruction to the acceptance I/F 60. The acceptance I/F 60 outputs the input instruction content signal to the CPU 74. The CPU 74 executes processing corresponding to the instruction content signal input from the acceptance I/F 60.

A memory card 66 is attachably and detachably connected to the media I/F 64. The media I/F 64 records and reads out an image file to and from the memory card 66 under the control of the CPU 74.

The image file read out from the memory card 66 by the media I/F 64 is decompressed by the image processing unit 56 under the control of the CPU 74, and is displayed as the reproduction image on the display 28.

In the imaging device 10, the operation mode is switched according to the instruction accepted by the acceptance device 62. For example, in the imaging device 10, in the imaging mode, the still image imaging mode and the motion picture imaging mode are selectively set according to the instruction accepted by the acceptance device 62. In the still image imaging mode, a still image file can be recorded in the memory card 66, and in the motion picture imaging mode, a motion picture file can be recorded in the memory card 66.

In a case where the instruction to image the still image is accepted by the release button 26 in the still image imaging mode, the CPU 74 controls the imaging element driver 50 to cause the imaging element 22 to perform the main exposure for one frame. Under the control of the CPU 74, the image processing unit 56 acquires the image signal obtained by performing the exposure for one frame, performs compression processing on the acquired image signal, and generates the still image file in a specific still image format. The specific still image format may be, for example, a Joint Photographic Experts Group (JPEG) format. The still image file is recorded in the memory card 66 by the media I/F 64 under the control of the CPU 74.

In a case where an instruction to image the motion picture is accepted by the release button 26 in the motion picture imaging mode, the image processing unit 56 performs the compression processing on the image signal for the live view image, and generates the motion picture file in a specific motion picture format. The specific motion picture format may be, for example, a Moving Picture Experts Group (MPEG) format. The motion picture file is recorded in the memory card 66 by the media I/F 64 under the control of the CPU 74.

Next, a function of the imaging device 10 in a case where the focusing control processing in the autofocus is executed will be described as a function of the imaging device 10 of the present embodiment.

Figure 8:
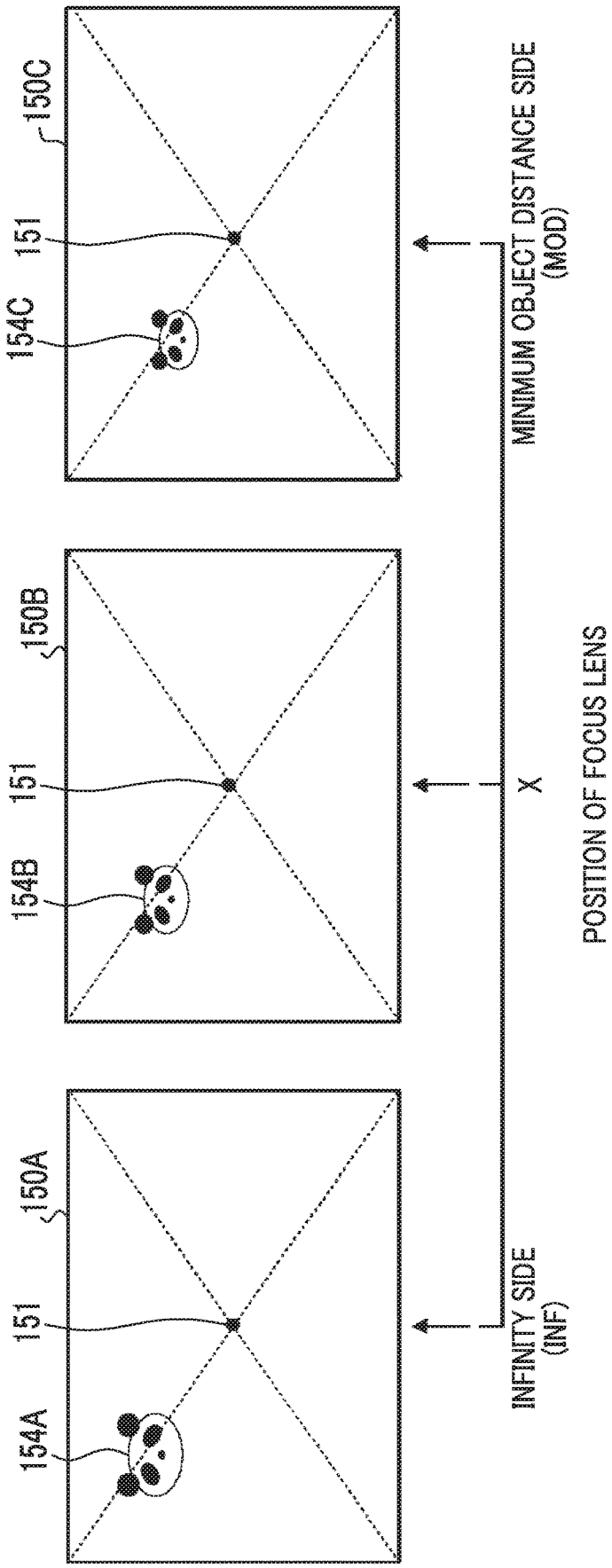
FIG. 8 is an explanatory diagram for describing an example of a relationship between movement of a position of a focus lens, a change of image magnification, and a change of a position of an image of a subject in the imaging device of the embodiment.

In a case where the focus lens 84 is moved in the range between the infinity side and the minimum object distance side, the image magnification of the focus lens 84 may change as the position of the focus lens 84 changes. For example, in a case where the focus lens 84 moves from the infinity side to the minimum object distance side, the image magnification of the focus lens 84 increases, and in a case where the focus lens 84 moves from the minimum object distance side to the infinity side, the image magnification of the focus lens 84 may be reduced. In this case, as shown in FIG. 8, in a case where the image magnification of the focus lens 84 changes according to the position of the focus lens 84, positions and sizes of images 154 (154A, 154B, and 154C) of the subject included in captured images 150 (150A, 150B, and 150C) may change. Hereinafter, in a case where the captured images 150A, 150B, and 150C and the images 154A, 154B, and 154C of the subject are collectively referred to as, the individual references (A to C) may be omitted. Hereinafter, the positions of the images 154 of the subject may be simply referred to as "image positions".

In the example shown in FIG. 8, as for the sizes of the images 154 of the subject, the image 154A of the subject of the captured image 150A corresponding to the infinity side is the largest, and the image 154B of the subject of the captured image 150B corresponding to a position X between the infinity side and the minimum object distance side and the image 154C of the subject of the captured image 150C corresponding to the minimum object distance side become smaller in this order. As for the positions of the images 154 of the subject, the image 154A of the subject of the captured image 150A is closest to an outer edge of the captured image 150, and the image 154B of the subject of the captured image 150B and the image 154C of the subject of the captured image 150C become closer to a center 151 of the captured image 150 in this order. That is, as the focus lens 84 approaches the infinity side, the position of the image 154 of the subject tends to move in a direction from the center 151 of the captured image 150 toward the outer edge. As the focus lens 84 approaches the infinity side, the sizes of the images 154 of the subject tend to increase. Conversely, as the focus lens 84 approaches the minimum object distance side, the image 154 of the subject tends to move to a position toward the center 151 from the outer edge of the captured image 150, and the image tends to become smaller.

Figure 9:
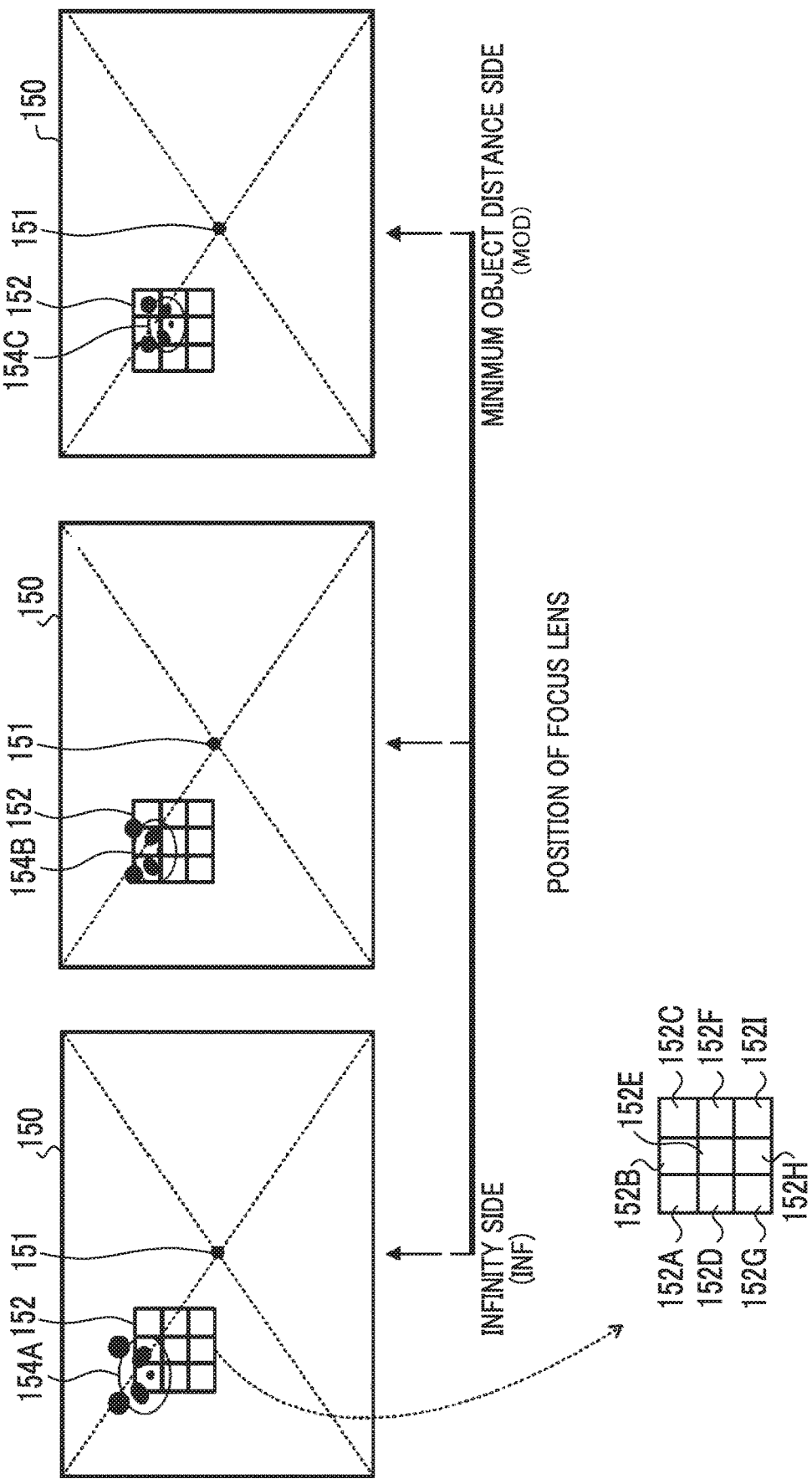
FIG. 9 is an explanatory diagram for describing an example of a multi-point distance measurement and an addition area distance measurement in an imaging device of a first embodiment.

As described above, in order to restrain the image 154 of the subject from deviating from the distance measurement area due to the change in the position of the image 154 of the subject, in the imaging device 10 of the present embodiment, a so-called multi-point distance measurement for setting a plurality of distance measurement areas is set within the captured image 150 is performed. FIG. 9 shows an example in which the plurality of distance measurement areas is set. FIG. 9 shows a case where nine distance measurement areas 152A, 152B, 152C, 152D, 152E, 152F, 152G, 152H, and 152I are set. As in the example shown in FIG. 9, the distance measurement areas 152A to 152I of the present embodiment have the same shape and size, and are arranged in a state of being adjacent to each other. Hereinafter, in a case where the distance measurement areas 152A to 152I are collectively referred to as, these areas are referred to as the distance measurement areas 152. In the imaging device 10 of the present embodiment, processing of performing the multi-point distance measurement is an example of first processing performed by the processing unit of the present disclosure.

In the multi-point distance measurement, the contrast value of each distance measurement area 152 is acquired, and the position of the focus lens 84 corresponding to a peak of a change of the contrast value is detected for each distance measurement area 152. The focusing position of the focus lens 84 is specified from the position of the focus lens 84 detected for each distance measurement area 152.

The method of specifying the focusing position of the focus lens 84 from the position of the focus lens 84 detected for each distance measurement area 152 is not particularly limited. For example, a front position priority method of specifying a frontmost position among the detected positions of the focus lens 84 as the focusing position may be applied by taking into consideration that a main subject tends to be located in front. For example, in a case where the number of distance measurement areas 152 close to the detected positions of the focus lens 84 is equal to or greater than a predetermined number, an area method of specifying, as the focusing position, an average value of the positions of the focus lens 84 detected from the distance measurement areas 152 may be applied.

Figure 10:
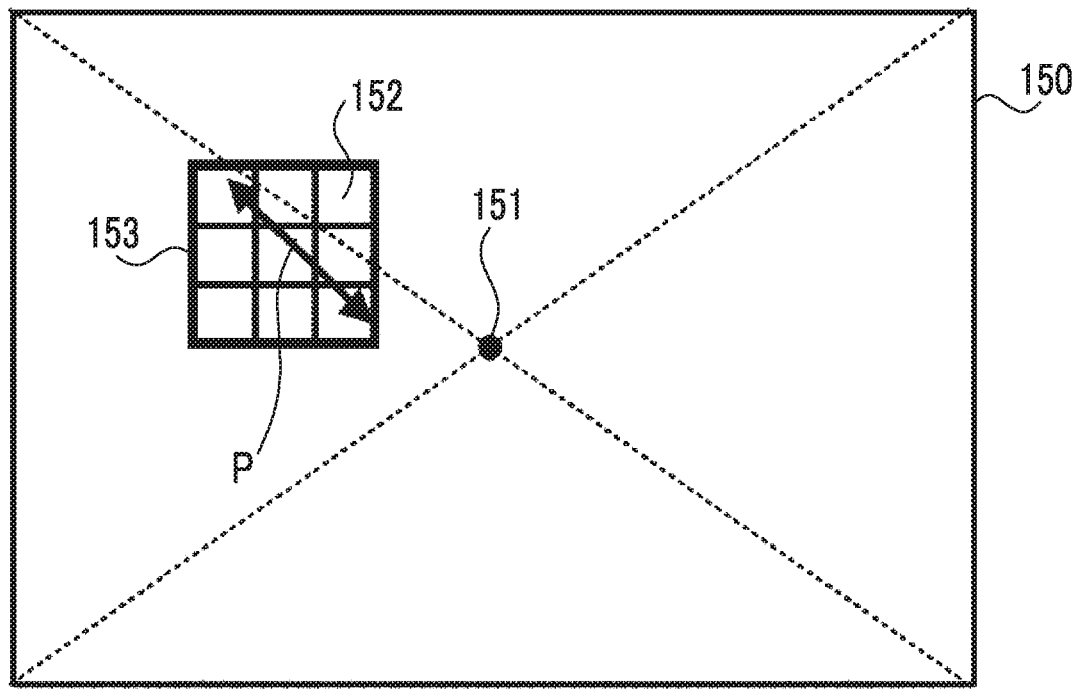
FIG. 10 is an explanatory diagram for describing an example of the multi-point distance measurement and the addition area distance measurement in the imaging device of the first embodiment.

In a case where the position of the focus lens 84 changes, the position of the image 154 of the subject changes for each distance measurement area 152 in a direction of an arrow P shown in FIG. 10. Thus, the image 154 of the subject may be included in or excluded from each distance measurement area 152, and a stable contrast value may not be acquired.

Thus, in the imaging device 10 of the present embodiment, in a case where the CPU 74 determines that the amount of change of the image position corresponding to the amount of change of the image magnification of the focus lens 84 is small and the stable contrast value can be acquired, the multi-point distance measurement is performed. Meanwhile, in a case where the amount of change of the image position is large and there is a concern that the stable contrast value cannot be acquired, control is performed such that the position of the focus lens 84 is detected based on an added value obtained by adding the contrast values of the distance measurement areas 152 and the detected position is used as the focusing position instead of the multi-point distance measurement. This control is equivalent to control performed such that the peak of the change of the contrast value is detected from one large distance measurement area 152 in which the nine distance measurement areas 152 are combined by adding the contrast values of the distance measurement areas 152 and the position of the focus lens 84 is detected. In the entire distance measurement area 152, since the number of times the image 154 of the subject is included in and excluded from the distance measurement area is smaller than in the case of each one distance measurement area 152, the stable contrast value can be acquired as compared with the case of each one distance measurement area 152. In the present embodiment, the method of specifying the focusing position by adding the contrast values of the plurality of distance measurement areas 152 as described above, is referred to as an "addition area distance measurement". Hereinafter, in the addition area distance measurement, the entire distance measurement area formed by the plurality of distance measurement areas 152 to be added is referred to as a "distance measurement area 153" for the sake of convenience in description. In the imaging device 10 according to the present embodiment, processing of performing the addition area distance measurement is an example of second processing performed by the processing unit of the present disclosure.

Figure 11:
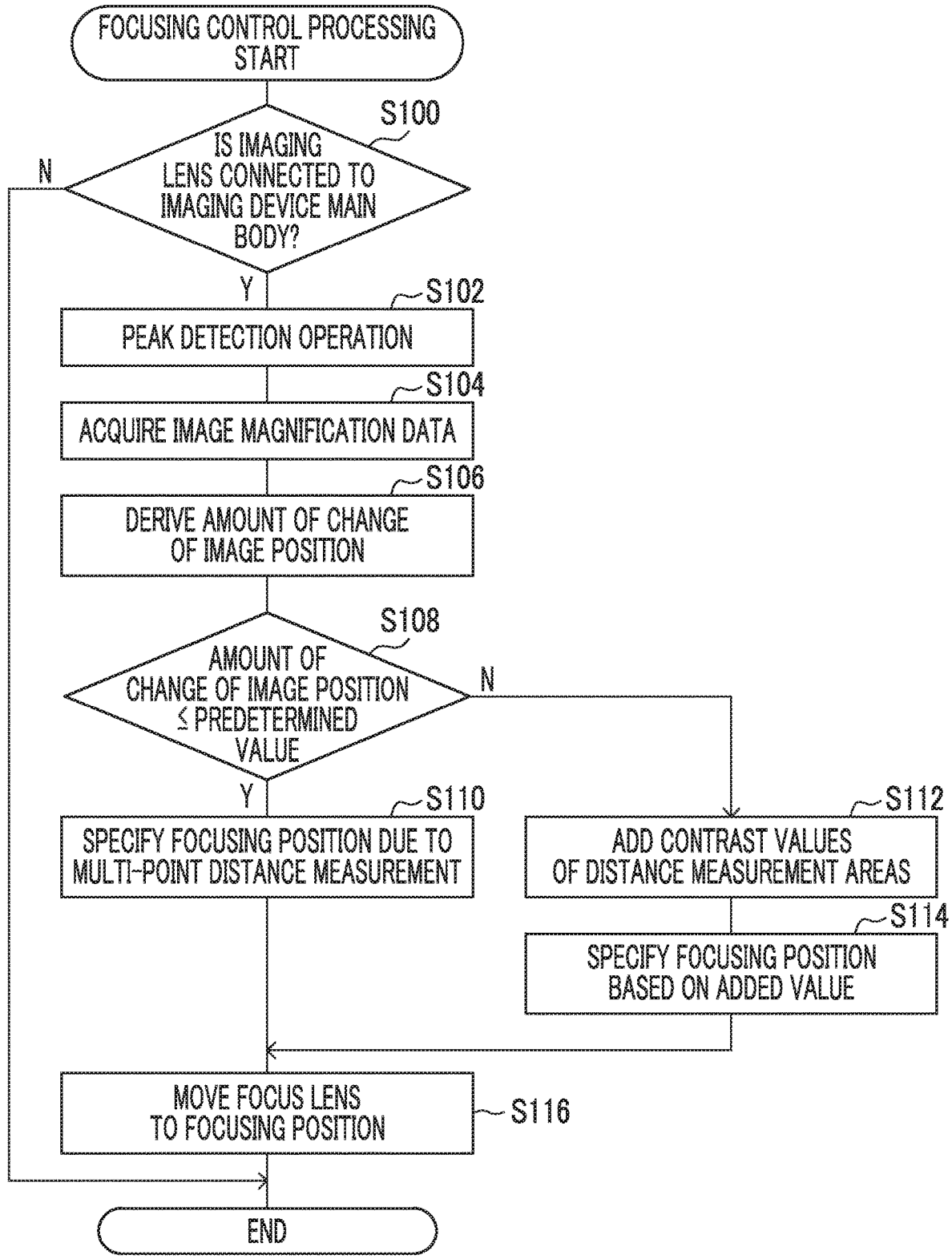
FIG. 11 is a flowchart showing an example of a flow of focusing control processing of the first embodiment.

Next, the focusing control processing executed by the CPU 74 of the present embodiment will be described. FIG. 11 shows a flowchart of an example of the focusing control processing executed by the CPU 74 of the imaging device 10 of the present embodiment. In the present embodiment, in a case where the user pushes the release button 26 up to the half-pushing state, the CPU 74 of the imaging device 10 executes the focusing control processing shown in FIG. 11 by reading out the focusing control program 79 from the secondary storage unit 78, loading the program into the primary storage unit 76, and executing the program.

In step S100 of FIG. 11, the CPU 74 determines whether or not the imaging lens 14 is connected to the imaging device main body 12 in a state of being able to communicate with the control device 40 of the imaging lens 14. In the present embodiment, specifically, the CPU 74 determines whether or not the mount 15 is connected to the mount 13. In a case where the imaging lens 14 is not connected to the imaging device main body 12, the determination in step S100 is a negative determination, and the present focusing control processing is ended. Meanwhile, in a case where the imaging lens 14 is connected to the imaging device main body 12, the determination in step S100 is a positive determination, and the processing proceeds to step S102.

In the next step S102, the CPU 74 performs a peak detection operation of detecting the peak of the contrast value. In a case where the movement of the focus lens 84 is started, the CPU 74 detects the contrast value of the image of the subject within the distance measurement area 152 for each distance measurement area 152 at each position at which the focus lens 84 is moved, and detects the position of the focus lens 84 at which the contrast value is the peak.

In step S104, the CPU 74 acquires the image magnification data 110. As described above, the image magnification data 110 is stored in the secondary storage unit 102 included in the control device 40 of the imaging lens 14. Thus, the CPU 74 acquires the image magnification data 110 read out from the secondary storage unit 102 by the CPU 98 of the control device 40 via the external I/F 72 and the external I/F 96.

In the next step S106, the CPU 74 derives the amount of change of the image position. Specifically, the CPU 74 of the present embodiment first derives the amount of change of the image position (the position of the image 154 of the subject) in the range (hereinafter, referred to as a "peak search range") in which the focus lens 84 is moved in order to detect the peak of the contrast value based on the image magnification data 110.

It is assumed that a position (start position) at which the detection of the peak is started in the peak search range is ps and an image magnification corresponding to the start position ps is K [ps]. It is assumed that a position (end position) at which the detection of the peak is ended is pe and an image magnification corresponding to the end position pe is K [pe]. In a case where a distance from the center 151 of the captured image 150 to a center of the distance measurement area 152 is R, the amount of change D of the image position during the peak search is derived by the following Expression (1) indicating the amount of relative movement of the image 154 between the start position ps to the end position pe.

$$D=|R\times(K[ps]-K[pe])\div K[ps]| \quad (1)$$

In the next step S108, the CPU 74 determines whether or not the amount of change D of the image position derived in step S106 is equal to or less than a predetermined value. The CPU 74 functions as the controller of the present disclosure by executing step S108, and performs control such that one processing to be performed by the processing unit is switched according to the amount of change D of the image position corresponding to the change of the image magnification of the imaging lens 14.

That is, in a case where the amount of change D of the image position is equal to or less than the predetermined value, the determination in step S108 is a positive determination, and the processing proceeds to step S110. In step S110, the CPU 74 specifies the focusing position of the focus lens 84 by the multi-point distance measurement. Any one of the front position priority method or the area method may be applied as the method of specifying the focusing position from the position of the focus lens 84 detected by each distance measurement area 152. Alternatively, any one method may be determined in advance, or may be selected by the user.

Meanwhile, in a case where the amount of change D of the image position is not equal to or less than the predetermined value, in other words, in a case where the amount of change D of the image position exceeds the predetermined value, the determination in step S108 is a negative determination, and the processing proceeds to step S112. In this case, the CPU 74 performs the addition area distance measurement. Thus, in step S112, the CPU 74 adds the contrast values of the distance measurement areas 152. In the next step S114, the CPU 74 specifies the focusing position based on the added value. As described above, the CPU 74 functions as the processing unit of the present disclosure, and any one of the multi-point distance measurement or the addition area distance measurement is performed.

In the next step S116, the CPU 74 causes the focus lens drive unit 90 to move the focus lens 84 to the specified focusing position. Due to the processing of step S116, the focus lens 84 is moved to the focusing position. Thus, a so-called focusing state is achieved, and the present focusing control processing is ended.

As described above, in the imaging device 10 of the present embodiment, in a case where the amount of change of the image position that changes with the change of the position of the focus lens 84 exceeds the predetermined value, the addition area distance measurement is performed instead of the multi-point distance measurement. Since the addition area distance measurement is performed, this measurement is equivalent to the method of specifying the focusing position of the focus lens 84 based on the contrast value of the image 154 of the subject within the distance measurement area 153 which the distance measurement areas 152 are combined. Thus, according to the imaging device 10 of the present embodiment, even though the image position changes according to the change of the image magnification of the focus lens 84, since the contrast value can be stably acquired, specification accuracy of the focusing position can be improved.

Second Embodiment

Hereinafter, a second embodiment will be described in detail. In the present embodiment, the same configurations and functions as those described in the first embodiment will be assigned by the same references, and detailed description thereof will be omitted.

The configuration of the imaging device 10 of the present embodiment is the same as the configuration of the imaging device 10 of the first embodiment (see FIGS. 1 to 4), and thus, description thereof will be omitted. The CPU 74 of the present embodiment is an example of an instruction unit of the present disclosure.

Meanwhile, the function of the imaging device 10 of the present embodiment is different in a part of the focusing control processing. In the focusing control processing, the subject may move during the operation of the peak detection. In a case where the subject moves, the position of the image 154 of the subject in the captured image 150 also changes. As a method corresponding to such a case, there is a method called a so-called subject tracking mode. In the subject tracking mode, the CPU 74 performs movement processing of tracking the image 154 of the specific subject included in the captured image 150 by using the captured image 150 acquired during the operation of the peak detection and moving the position of the distance measurement area 152 according to the movement of the image 154 of the subject.

As described above, in the subject tracking mode, since the position of the distance measurement area 152 is moved according to the movement of the image 154 of the subject, even though the image position changes due to the movement of the position of the focus lens 84, the position of the distance measurement area 152 is moved according to the position of the image 154 of the moved subject. Thus, as described in the first embodiment, the image 154 of the subject is sufficiently included within the distance measurement area 152 without performing the addition area distance measurement. Accordingly, in the focusing control processing of the present embodiment, the multi-point positioning is performed in a case where the subject tracking mode is executed.

Figure 12:
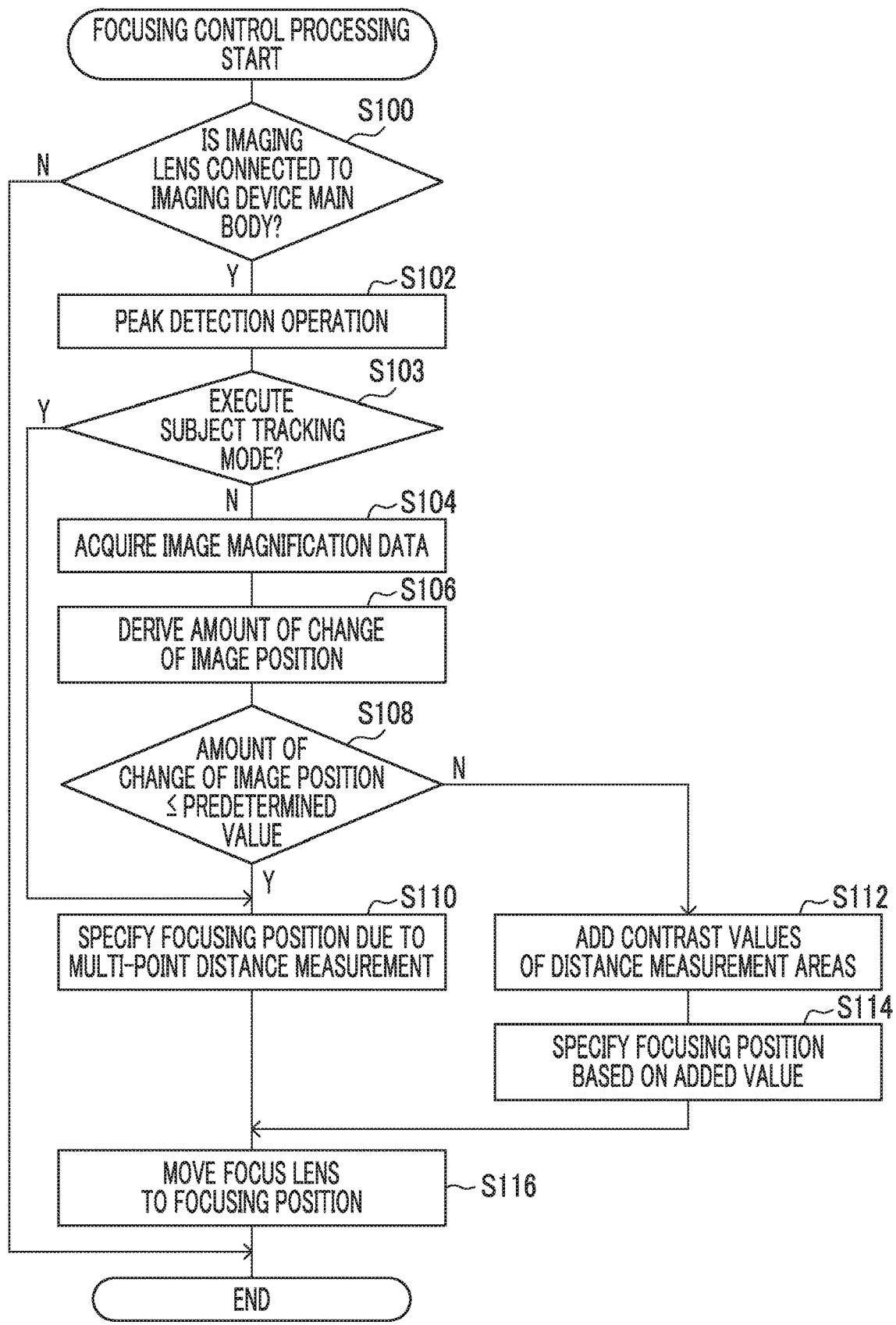
FIG. 12 is a flowchart showing an example of a flow of focusing control processing of a second embodiment.

FIG. 12 is a flowchart showing an example of a flow of the focusing control processing according to the present embodiment. As shown in FIG. 12, the focusing control processing of the present embodiment is different from the focusing control processing (see FIG. 11) of the first embodiment in that the processing of step S103 is executed between steps S102 and S104.

In step S103 shown in FIG. 12, the CPU 74 determines whether or not to execute the subject tracking mode. In the imaging device 10 of the present embodiment, for example, in a case where the acceptance device 62 accepts an instruction to execute the subject tracking mode from the user, the CPU 74 executes the subject tracking mode. Thus, in a case where the acceptance device 62 accepts the instruction to execute the subject tracking mode, the determination in step S103 is a positive determination, and the processing proceeds to step S110. Accordingly, in a case where the subject tracking mode is executed, the multi-point distance measurement is performed.

Meanwhile, in a case where the acceptance device 62 does not accept the instruction to execute the subject tracking mode, the determination in step S103 is a negative determination, and the processing proceeds to step S104. Thus, in a case where the subject tracking mode is not executed and the amount of change of the image position exceeds the predetermined value, the addition area distance measurement is performed as in the first embodiment.

As described above, in the imaging device 10 of the present embodiment, in a case where the subject tracking mode in which the position of the distance measurement area 152 is moved according to the movement of the image 154 of the subject is executed, the focusing position is specified by the multi-point distance measurement.

Accordingly, according to the imaging device 10 of the present embodiment, since it is possible to restrain an image other than the image 154 of the subject from being included in the distance measurement area 152, it is possible to restrain a subject different from the specific subject corresponding to the image 154 of the subject from being focused, and it is possible to easily focus on the specific subject.

Third Embodiment

Hereinafter, a third embodiment will be described in detail. In the present embodiment, the same configurations and functions as those described in the first and second embodiments will be assigned by the same references, and detailed description thereof will be omitted.

The configuration of the imaging device 10 of the present embodiment is the same as the configuration of the imaging device 10 of the first embodiment (see FIGS. 1 to 4), and thus, description thereof will be omitted.

It has been described in the second embodiment in which the subject tracking mode is executed by the CPU 74 in a case where the acceptance device 62 accepts the instruction to execute the subject tracking mode from the user. In the present embodiment, a mode in which the subject tracking mode can be automatically executed even though the acceptance device 62 does not accept the instruction to execute the subject tracking mode from the user will be described.

In a case where the subject tracking mode is executed, the CPU 74 executes processing of performing image analysis on the captured image 150, detecting a face of the subject, and tracking on an area including the detected face. In this processing, since the area including the face of the subject is detected by performing template matching on the plurality of captured images 150 acquired while the focus lens 84 is moving and a moved position of the image 154 of the subject is detected, a load of arithmetic processing is high, and it takes a time to perform the arithmetic processing. Thus, when the frame rate during the peak detection operation becomes high, the arithmetic processing may not catch up, and the distance measurement area 152 may not be moved in real time.

Thus, in the imaging device 10 of the present embodiment, it is determined whether or not to execute the subject tracking mode according to at least one of the frame rate or the time expected to be taken for the arithmetic processing (hereinafter, referred to as an "expected arithmetic time").

Figure 13:
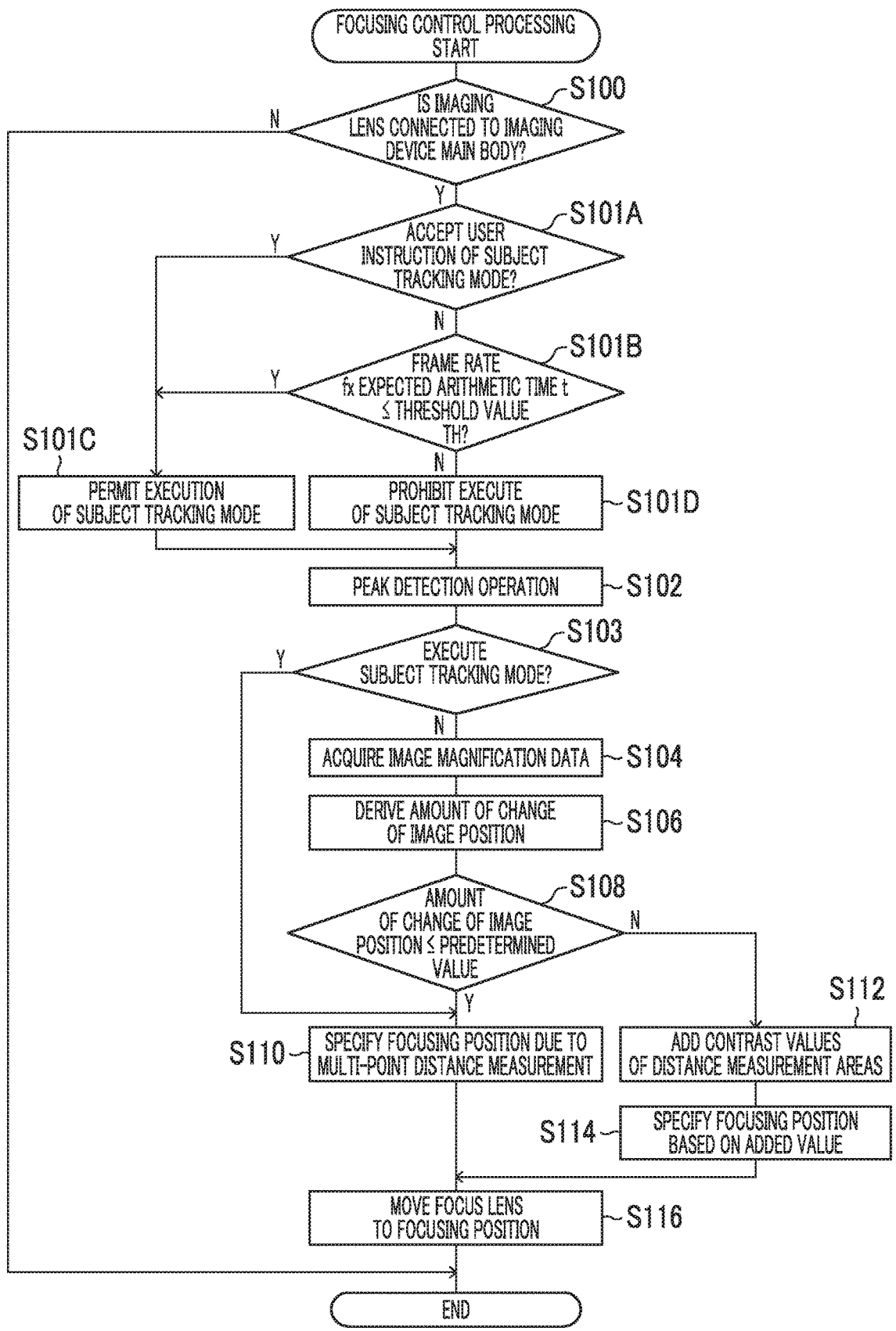
FIG. 13 is a flowchart showing an example of a flow of focusing control processing of a third embodiment.

FIG. 13 is a flowchart showing an example of a flow of the focusing control processing of the present embodiment. As shown in FIG. 13, in the focusing control processing of the present embodiment, processing of steps S101A, S101B, S101C, and S101D are executed between steps S100 and S102 of the focusing control processing (see FIG. 12) of the second embodiment.

In step S101A shown in FIG. 13, the CPU 74 determines whether or not the acceptance device 62 accepts the instruction to execute the subject tracking mode from the user. In a case where the acceptance device 62 accepts the instruction to execute the subject tracking mode from the user, the determination in step S101A is a positive determination, and the processing proceeds to step S101C.

Meanwhile, in a case where the acceptance device 62 does not accept the instruction to execute the subject tracking mode from the user, the determination in step S101A is a negative determination, and the processing proceeds to step S101B.

In step S101B, the CPU 74 determines whether or not a value obtained by multiplying a frame rate f [Hz] by an expected arithmetic time t (sec) is equal to or less than a threshold value TH (f×t≤TH). In the present embodiment, since the frame rate is high, the CPU 74 determines whether or not the arithmetic processing required to detect the change of the position of the subject cannot catch up by executing the processing of the present step S101B. The threshold value TH used for the present determination may be obtained in advance by experiments, and may be stored in the secondary storage unit 78. Since the expected arithmetic time t varies depending on a size and/or resolution of the captured image 150, a plurality of expected arithmetic times t corresponding to the size and/or resolution of the captured image 150 is stored in the secondary storage unit 78 in advance in the imaging device 10 of the present embodiment. The expected arithmetic time t of the present embodiment is an example of an expected processing time of the present disclosure.

In a case where the value obtained by multiplying the frame rate f and the expected arithmetic time t is equal to or less than the threshold value TH, the determination in step S101B is a positive determination, and the processing proceeds to step S101C. In step S101C, the CPU 74 permits the execution of the subject tracking mode.

Meanwhile, in a case where the value obtained by multiplying the frame rate f and the expected arithmetic time t is not equal to or less than the threshold value TH, in other words, in a case where the value obtained by multiplying the frame rate f and the expected arithmetic time t exceeds the threshold value TH, the determination in step S101B is a negative determination, and the processing proceeds to step S101D. In step S101D, the CPU 74 prohibits the execution of the subject tracking mode.

For example, in a case where the threshold value TH is 5 (TH=5) and the expected arithmetic time t is 0.01 [sec], the following relationship is satisfied according to the frame rate f.

In a case where the frame rate f is 100 [Hz], since the following relationship is satisfied, $$t \times f = 0.01 \times 100 = 1 \leq TH$$

the determination in step S101B is a positive determination, and the execution of the subject tracking mode is permitted in step S101C.

Meanwhile, in a case where the frame rate f is 1000 [Hz], since the following relationship is satisfied, $$t \times f = 0.01 \times 1000 = 10 > TH$$

the determination in step S103B is a negative determination, and the execution of the subject tracking mode is prohibited in step S101D.

As described above, in the present embodiment, in a case where the frame rate f is high, the CPU 74 prohibits the execution of the subject tracking mode.

For example, in a case where the threshold value TH is 5 (TH=5) and the frame rate f is 100 [Hz], the following relationship is satisfied according to the expected arithmetic time t.

In a case where the expected arithmetic time t is 0.01 [sec], since t×f=1≤TH as described above, the determination in step S103B is a positive determination, and the execution of the subject tracking mode is permitted in step S101C.

Meanwhile, in a case where the expected arithmetic time t is 0.1 [sec], since the following relationship is satisfied, $$t \times f = 0.1 \times 100 = 10 > TH$$

step S101B is a negative determination, and the execution of the subject tracking mode is prohibited in step S101D.

As described above, in the present embodiment, in a case where the expected arithmetic time t becomes long, the execution of the subject tracking mode is prohibited by the CPU 74.

In the present embodiment, whether or not the execution of the subject tracking mode is permitted or prohibited is determined by comparing the value obtained by multiplying the frame rate f and the expected arithmetic time t with the threshold value TH. However, the present invention is not limited thereto. Whether the execution of the subject tracking mode is permitted or prohibited according to at least one of the frame rate f or the expected arithmetic time t may be determined.

As described above, in the imaging device 10 of the present embodiment, it is expected that the distance measurement area 152 cannot be moved in real time in a case where the subject tracking mode is executed according to at least one of the frame rate for the expected arithmetic time t, and the focusing position is specified by the addition area distance measurement in a case where the amount of change D of the image position exceeds the predetermined value.

Accordingly, according to the imaging device 10 of the present embodiment, it is possible to increase a probability that the image 154 of the subject is included within the distance measurement area 152.

Fourth Embodiment

Hereinafter, a fourth embodiment will be described in detail. In the present embodiment, the same configurations and functions as those described in the first embodiment will be assigned by the same references, and detailed description thereof will be omitted.

The configuration of the imaging device 10 of the present embodiment is the same as the configuration of the imaging device 10 of the first embodiment (see FIGS. 1 to 4), and thus, description thereof will be omitted.

Meanwhile, the function of the imaging device 10 of the present embodiment is different in a part of the focusing control processing. As the method of the focusing control processing, in a case where the peak of the contrast value is detected during the movement of the focus lens 84 in the peak detection operation, a method of stopping the movement of the focus lens 84 and ending the peak detection operation (focusing control processing) has been known. The position of the peak in an optical axis direction varies depending on the distance from the imaging device 10 to the specific subject. Thus, in this method, as for the movement of the focus lens 84, a distance from the start position ps at which the peak detection operation is started to a position at which the movement of the focus lens 84 is stopped, that is, the peak search range varies depending on the distance from the imaging device 10 to the specific subject. Accordingly, the amount of change of the image position varies depending on the distance from the imaging device 10 to the specific subject.

In the imaging device 10 of the present embodiment, in a case where the peak detection operation is stopped, whether or not to perform the multi-point distance measurement and the addition area distance measurement is determined based on the amount of change of the image position derived according to the peak search range that is the range in which the focus lens 84 moves. In a case where the addition area distance measurement is performed, the imaging device 10 decides the distance measurement areas 152 to be added based on the amount of change of the image position.

Figure 14:
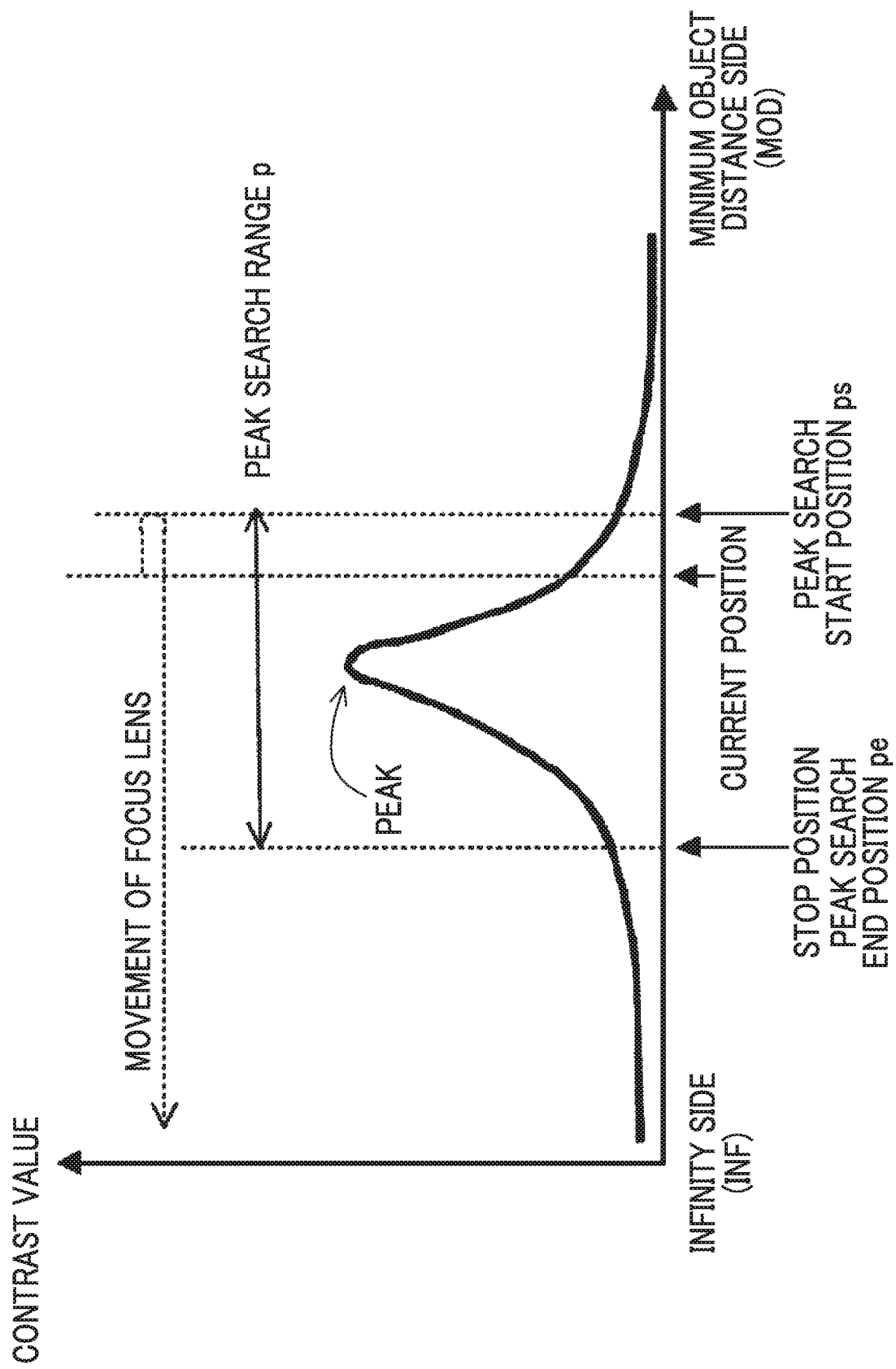
FIG. 14 is an explanatory diagram for describing an example of a peak search range of a fourth embodiment.

As shown in FIG. 14, in the present embodiment, in a case where the peak detection operation is performed, the focus lens 84 is moved once from a current position in a direction opposite to a movement direction for peak detection, uses the moved position as the start position ps of the peak detection operation, and uses this position as a reference position of the peak search range. For example, FIG. 14 shows a case where the focus lens 84 is moved from the minimum object distance (MOD) side to the infinity (INF) side.

Figure 15:
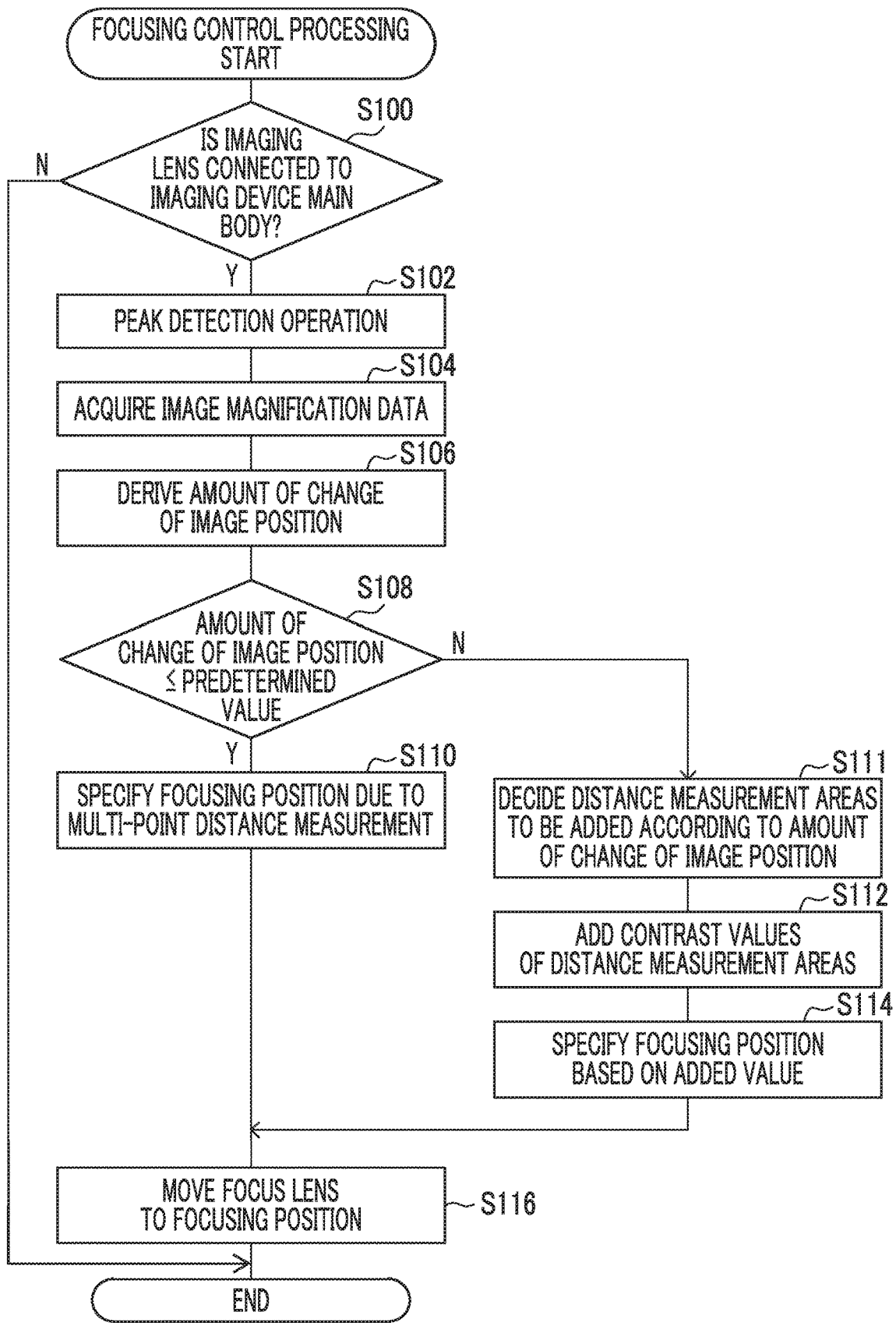
FIG. 15 is a flowchart showing an example of a flow of focusing control processing of the fourth embodiment.

FIG. 15 shows a flowchart showing an example of a flow of the focusing control processing of the present embodiment. As shown in FIG. 15, the focusing control processing of the present embodiment is different from the focusing control processing of the first embodiment (see FIG. 11) in that the processing of step S111 is executed before step S112.

In the present embodiment, as described above, in the peak detection operation of step S102, in a case where the peak of the change of the contrast value is detected before the focus lens 84 is moved to an end on the infinity side or an end on the minimum object distance side, the movement of the focus lens 84 is stopped. Here, the distance measurement area 152 for detecting the peak of the contrast value may be, for example, any one of the distance measurement areas 152A to 152I, or may be the predetermined distance measurement area 152. Alternatively, for example, the peaks may be detected in a predetermined number or more of distance measurement areas 152. Alternatively, for example, the peak may be detected for the subject at the frontmost position. In this case, as shown in FIG. 14, the position at which the movement of the focus lens 84 is stopped is the peak search end position pe.

In step S111 shown in FIG. 15, the CPU 74 decides the distance measurement areas 152 to which the contrast value is added according to the amount of change of the image position derived in step S106. In the imaging device 10 of the present embodiment, as the amount of change of the image position becomes larger, the number of distance measurement areas 152 to be added becomes larger. In other words, in the imaging device 10 of the present embodiment, as the amount of change of the image position becomes larger, the size of the distance measurement area 153 becomes larger.

Figure 16A:
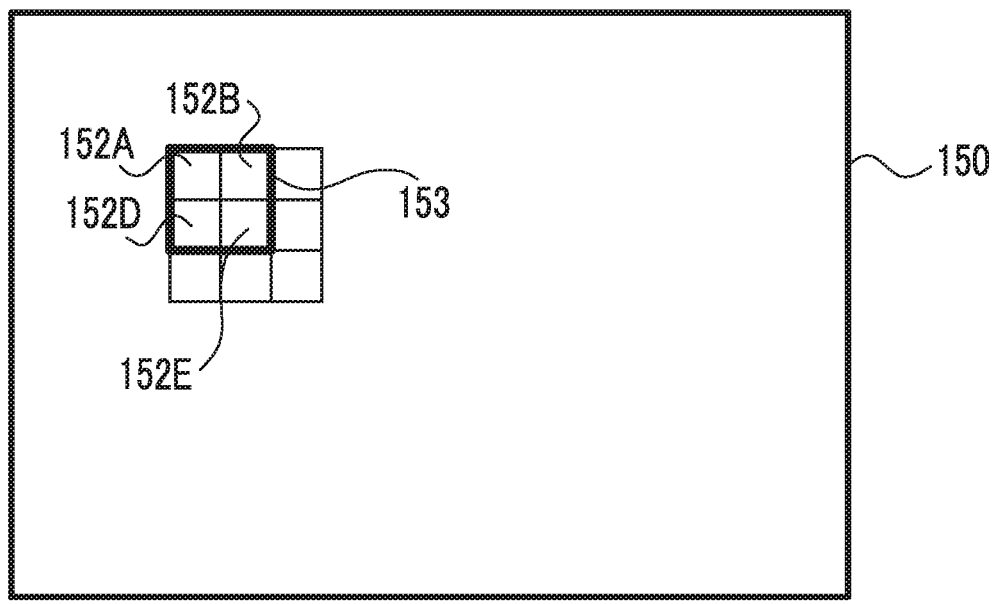
FIG. 16A is an explanatory diagram for describing an example of a distance measurement area to be added in an addition area distance measurement of the fourth embodiment.
Figure 16B:
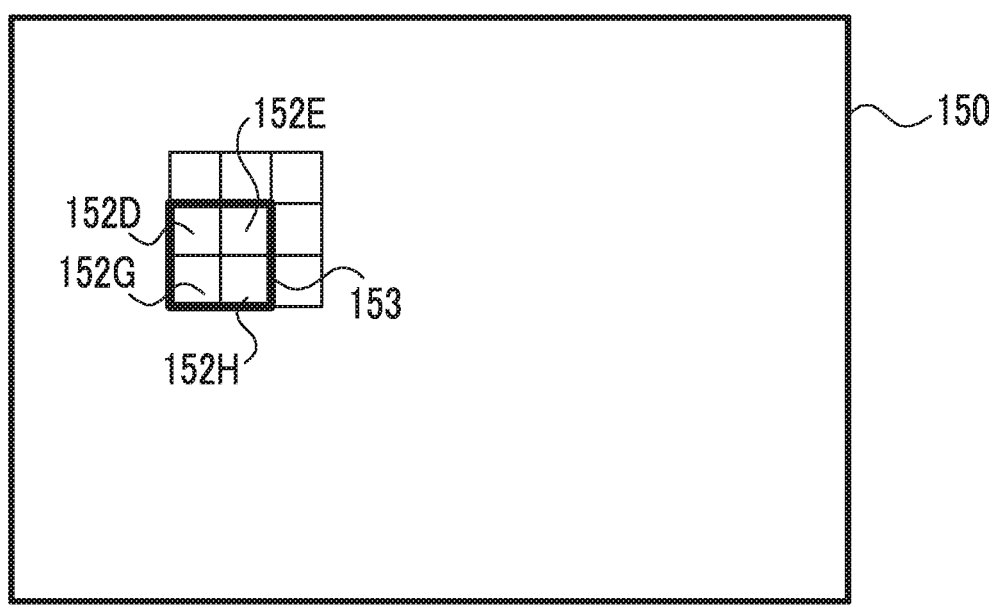
FIG. 16B is an explanatory diagram for describing an example of distance measurement areas to be added in the addition area distance measurement of the fourth embodiment.
Figure 16C:
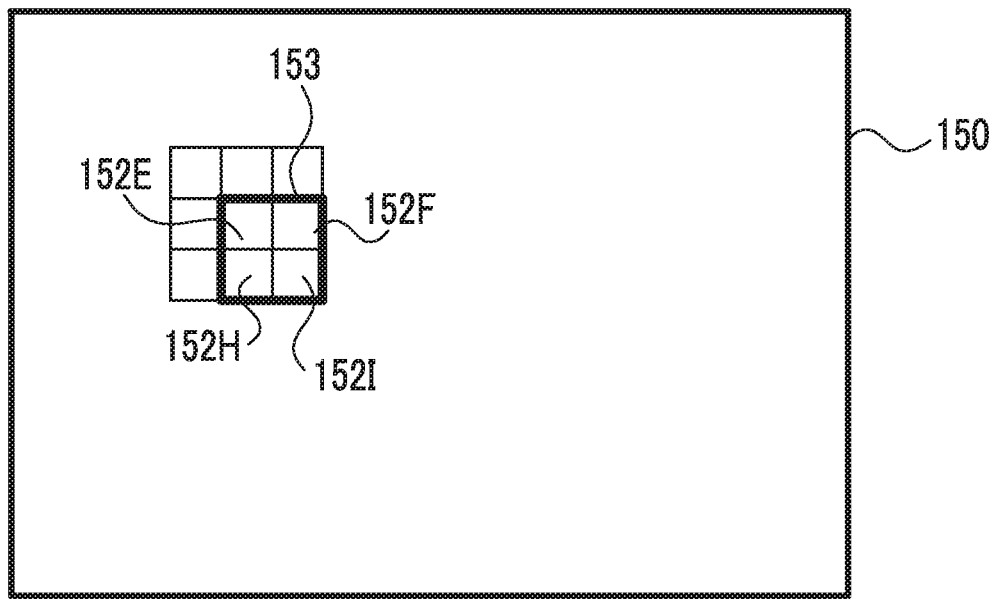
FIG. 16C is an explanatory diagram for describing an example of the distance measurement areas to be added in the addition area distance measurement of the fourth embodiment.
Figure 16D:
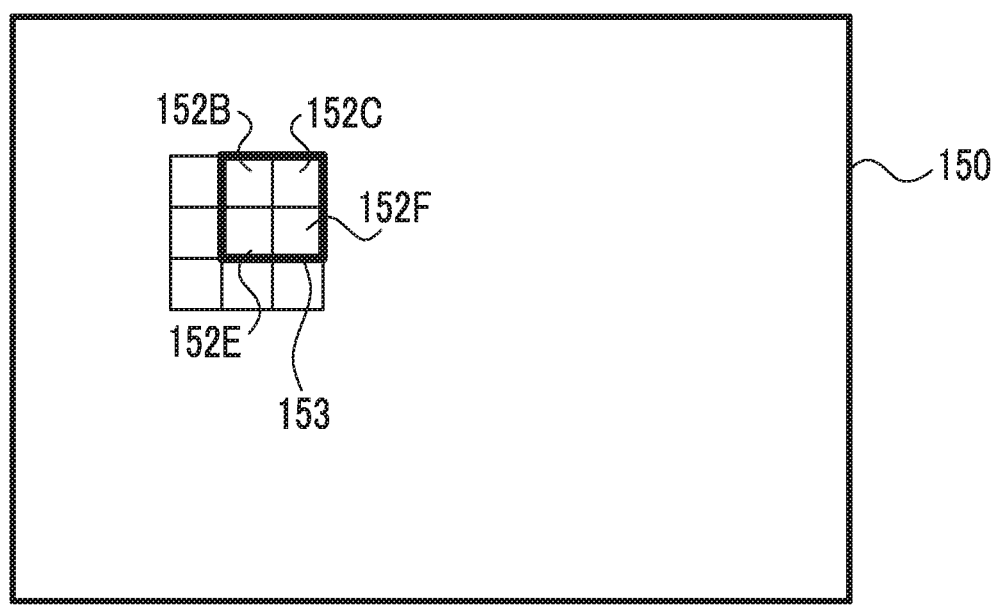
FIG. 16D is an explanatory diagram for describing an example of the distance measurement areas to be added in the addition area distance measurement of the fourth embodiment.

For example, a threshold value is predetermined in advance according to the amount of change of the image position, and the CPU 74 decides to add the contrast values of a total of four of 2×2 distance measurement areas 152 in a case where the amount of change is equal to or less than the threshold value. FIGS. 16A, 16B, 16C, and 16D show specific examples of the distance measurement area 153 including the four distance measurement areas 152. FIG. 16A shows the distance measurement area 153 including four distance measurement areas 152A, 152B, 152D, and 152E. FIG. 16B shows the distance measurement area 153 including four distance measurement areas 152D, 152E, 152G, and 152H. FIG. 16C shows the distance measurement area 153 including four distance measurement areas 152E, 152F, 152H, and 151E. FIG. 16D shows a distance measurement area 153 including four distance measurement areas 152B, 152C, 152E, and 152F.

The distance measurement area 153 is not limited to any of the examples shown in FIGS. 16A to 16D. For example, any one of FIGS. 16A to 16D may be determined in advance. For example, the CPU 74 may select any one of the distance measurement areas 153 shown in FIGS. 16A to 16D according to the direction in which the focus lens 84 is moved, that is, the movement direction of the image position. Specifically, as described above, in a case where the focus lens 84 moves from the minimum object distance side to the infinity side, since the image position moves in the direction from the center 151 of the captured image 150 toward the outer edge, the CPU 74 selects the distance measurement area 153 shown in FIG. 16A or 16B, for example. Meanwhile, as described above, in a case where the focus lens 84 moves from the infinity side to the minimum object distance side, since the image position moves in the direction from the outer edge of the captured image 150 toward the center 151, the CPU 74 selects the distance measurement area 153 shown in FIG. 16C or 16D.

Meanwhile, in a case where the amount of change of the image position exceeds the threshold value, the CPU 74 decides to add the contrast values of all (9) distance measurement areas 152.

As described above, in the imaging device 10 of the present embodiment, the addition area distance measurement is performed and the number of distance measurement areas 152 to be added is decided according to the amount of change of the image position corresponding to an actual peak search range p. Thus, according to the imaging device 10 of the present embodiment, since the peak of the contrast value is detected from the distance measurement area 152 (distance measurement area 153) having an appropriate size, it is possible to reduce a possibility that an image other than the image 154 of the subject is included within the distance measurement area 152 (distance measurement area 153).

Accordingly, according to the imaging device 10 of the present embodiment, even though the image position changes according to the change of the image magnification of the focus lens 84, it is possible to further improve the specification accuracy of the focusing position.

Fifth Embodiment

Hereinafter, a fifth embodiment will be described in detail. In the present embodiment, the same configurations and functions as those described in each of the aforementioned embodiments will be assigned by the same references, and detailed description thereof will be omitted.

The configuration of the imaging device 10 of the present embodiment is the same as the configuration of the imaging device 10 of the first embodiment (see FIGS. 1 to 4), and thus, description thereof will be omitted.

In the present embodiment, an example in which in a case where the subject tracking mode is executed, the distance measurement areas 152 to be added to the addition area distance measurement are decided according to the expected processing time (expected arithmetic time t) will be described.

Figure 17:
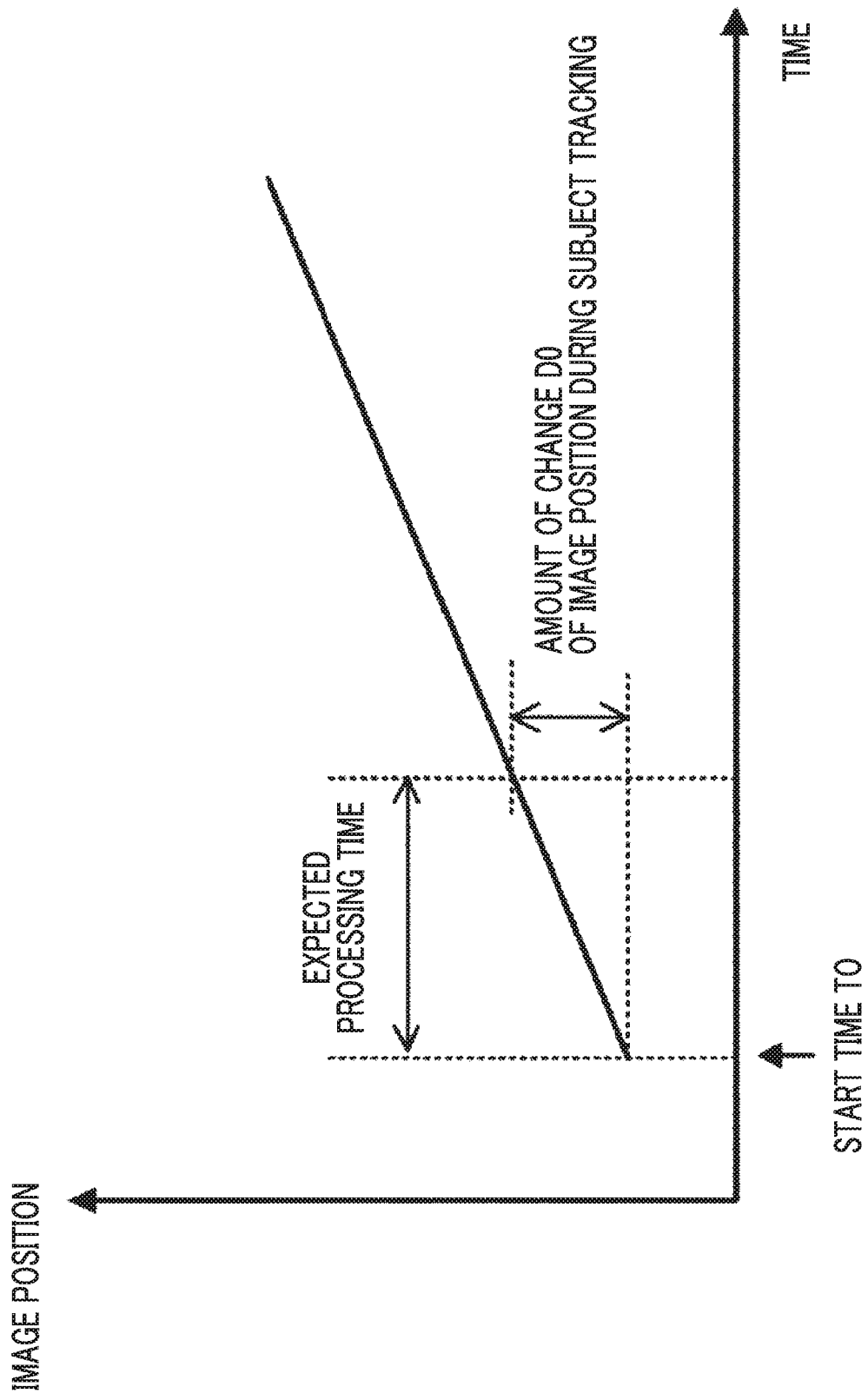
FIG. 17 is a graph showing an example of a relationship between an expected processing time and the amount of change of a position of an image of a subject in a fifth embodiment.

In a case where the peak detection operation is started in the focusing control processing, the position of the image 154 of the subject moves as in the example shown in FIG. 17 as the image magnification changes due to the movement of the focus lens 84. In FIG. 17, a horizontal axis represents a moving time of the focus lens 84, and a vertical axis represents the position of the image 154 of the subject.

As described above, in the subject tracking mode, the position of the distance measurement area 152 in the captured image 150 is moved based on a result of the arithmetic processing of detecting the moved position of the image 154 of the subject. Thus, until the result of the arithmetic processing is obtained for the first time after a start time TO at which the peak detection operation is started, the subject cannot be tracked, and the position of the distance measurement area 152 is not confirmed. Accordingly, in the present embodiment, the distance measurement areas 152 to be added in the addition area distance measurement are decided by using the amount of change DO of the image position in a time during which the arithmetic processing required for tracking the subject is being performed, specifically, a time (see FIG. 17, expected processing time) until the arithmetic processing result is obtained after the start time TO.

Figure 18:
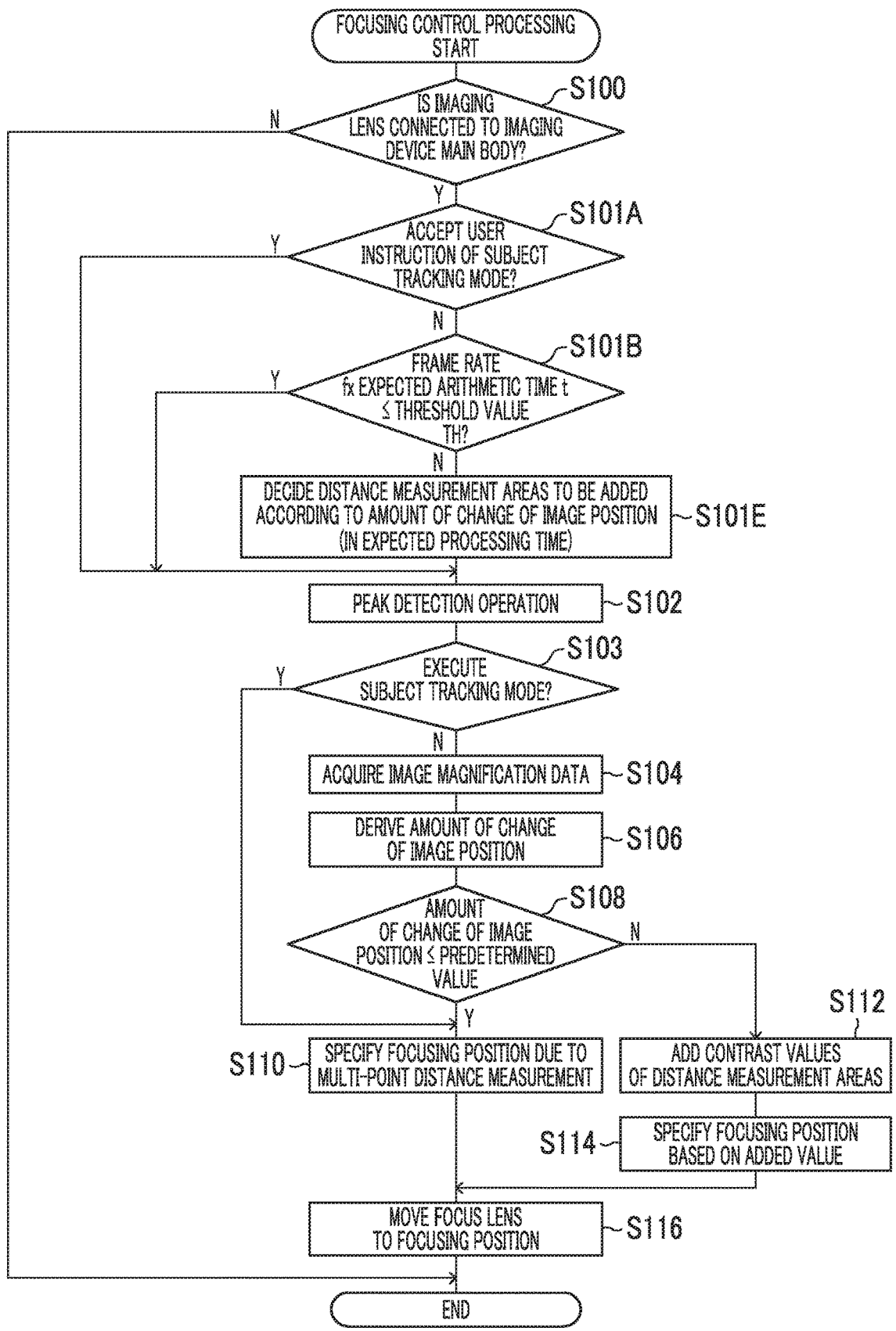
FIG. 18 is a flowchart showing an example of a flow of focusing control processing of the fifth embodiment.

FIG. 18 is a flowchart showing an example of a flow of the focusing control processing according to the present embodiment. As shown in FIG. 18, the focusing control processing of the present embodiment is different from the focusing control processing (see FIG. 13) of the third embodiment in that the processing of step S101E is executed instead of the processing of steps S101C and S101D.

Thus, in the present embodiment, in a case where the determination in step S101B shown in FIG. 18 is a positive determination, the processing proceeds to step S102. Meanwhile, in a case where step S101B is a negative determination, the processing proceeds to step S101E.

In step S101E, the CPU 74 decides the distance measurement areas 152 to be added according to the amount of change of the image position during the expected processing time. Thus, first, the CPU 74 derives the amount of change DO of the image position during the expected processing time. The amount of change of the image position during the expected processing time depends on the amount of movement of the focus lens 84 moved within the expected processing time. Thus, the CPU 74 of the present embodiment derives the amount of movement of the focus lens 84 from a value obtained by multiplying a moving speed of the focus lens 84 and the expected processing time. The CPU 74 derives the amount of change DO of the image position in the expected processing time by multiplying the calculated amount of movement of the focus lens 84 and the amount of change of the image position per unit movement amount for the amount of movement of the focus lens 84. As the expected processing time, a value obtained by an experiment may be stored in the secondary storage unit 78 in advance, and the moving speed of the focus lens 84 may be stored in the secondary storage unit 78 in advance.

The CPU 74 decides the distance measurement areas 152 to be added based on the derived amount of change DO. The method of deciding the distance measurement area 152 may be the same as that in step S111 of the focusing control processing (see FIG. 15) of the fourth embodiment.

As described above, in the imaging device 10 of the present embodiment, in the execution of the subject tracking mode, the distance measurement areas 152 to be added in the addition area distance measurement are decided according to the amount of change DO of the position of the image 154 of the subject in the expected processing time required for the arithmetic processing. Accordingly, according to the imaging device 10 of the present embodiment, since the distance measurement area 152 is decided during a period in which the position of the distance measurement area 152 in which the subject is tracked does not move, it is possible to increase a probability that the subject is caught within the distance measurement area 152 (distance measurement area 153) even though the subject is being tracked. Therefore, focusing accuracy can be improved.

Sixth Embodiment

Hereinafter, a sixth embodiment will be described in detail. It has been described in each of the aforementioned embodiments that in a case where the addition area distance measurement is performed, the distance measurement areas 152 to be added are not changed during the peak detection operation. In contrast, in the present embodiment, during the peak detection operation, the addition area distance measurement is performed while changing the position of the distance measurement areas 152 to be added according to the amount of change of the image position. In the present embodiment, the same configurations and functions as those described in each of the aforementioned embodiments will be assigned by the same references, and detailed description thereof will be omitted.

The configuration of the imaging device 10 of the present embodiment is the same as the configuration of the imaging device 10 of the first embodiment (see FIGS. 1 to 4), and thus, description thereof will be omitted.

Figure 19:
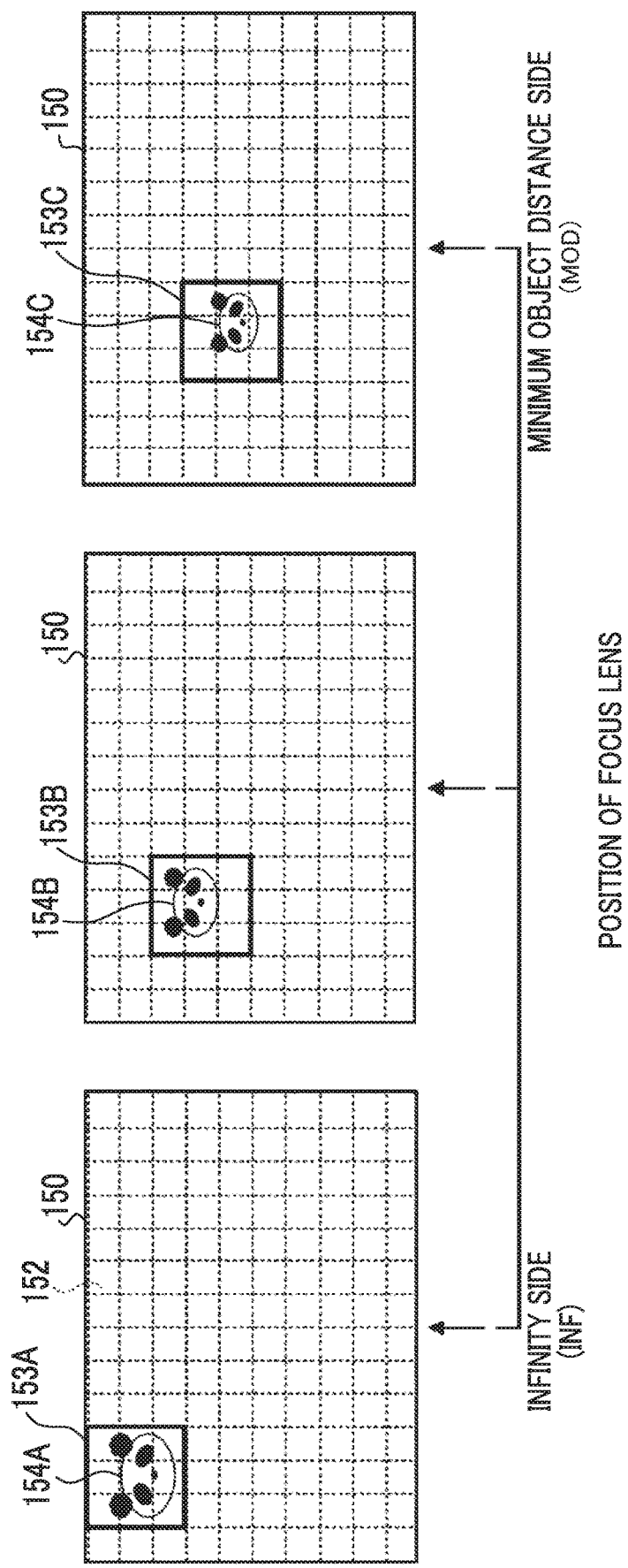
FIG. 19 is an explanatory diagram for describing an example of distance measurement areas to be added in an addition area distance measurement of a sixth embodiment.

As in the example shown in FIG. 19, in the present embodiment, the distance measurement area 152 capable of being added in the addition area distance measurement is set on the entire surface of the captured image 150. In the example shown in FIG. 19, during the peak detection operation, among a plurality of rectangular distance measurement areas 152 indicated by dotted lines provided within the captured image 150, adjacent nine distance measurement areas 152 selected according to the change of image magnification are selected as the distance measurement areas 152 to which the contrast value is added in the addition area distance measurement. That is, in the present embodiment, in a case where the addition area distance measurement is performed, the distance measurement areas 152 to which the contrast value is added sequentially change during the peak detection operation. In a case where the multi-point distance measurement is performed, among the plurality of distance measurement areas 152 shown in FIG. 19, nine adjacent distance measurement areas 152 (see FIG. 10) which are the distance measurement areas 152 at predetermined positions are applied.

Figure 20:
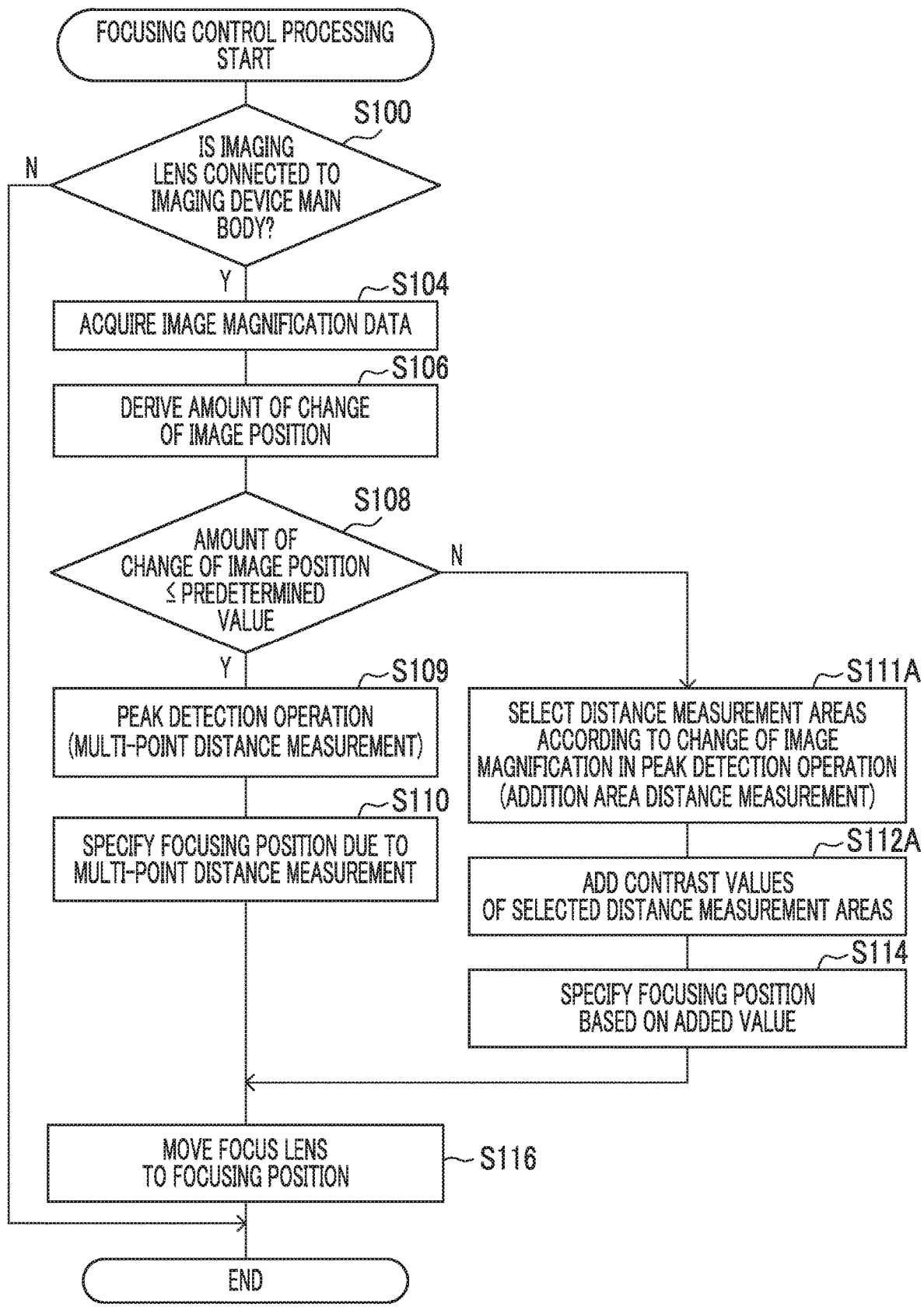
FIG. 20 is a flowchart showing an example of a flow of focusing control processing of the sixth embodiment.

FIG. 20 is a flowchart showing an example of a flow of the focusing control processing according to this embodiment. As shown in FIG. 20, the focusing control processing of the present embodiment is different from the focusing control processing of the first embodiment (see FIG. 11) in that the peak detection operation of step S102 is not executed and the processing of step S109 or step S111A and step S112A are executed after step S108.

In the present embodiment, as shown in FIG. 20, in a case where the determination in step S100 is a positive determination, the processing proceeds to step S104, and further proceeds to step S106. That is, in the present embodiment, the amount of change of the image position is derived in advance before the peak detection operation is performed.

In a case where the determination in step S108 is a positive determination, the processing proceeds to step S109. In step S109, the CPU 74 performs multi-point distance measurement as the peak detection operation. In a case where the multi-point distance measurement is performed, as described above, the peak detection operation is performed by applying the nine adjacent distance measurement areas 152 which are the distance measurement areas 152 at predetermined positions. That is, the peak detection operation is performed similarly to the peak detection operation in each of the aforementioned embodiments (for example, see step S102 of FIG. 11).

Meanwhile, in a case where the determination in step S108 is a negative determination, the processing proceeds to step S111A. In step S111A, the CPU 74 performs the addition area distance measurement as the peak detection operation. As shown in FIG. 19, in a case where the focus lens 84 moves, the position and size of the subject image 154 change according to the change of image magnification. Thus, as in the example shown in FIG. 19, the distance measurement areas 152 to be selected as the distance measurement area 153 are decided according to a changing direction of the image position. In other words, the position of the distance measurement area 153 changes according to the changing direction of the image position. Specifically, for example, as shown in FIG. 19, in a case where the focus lens 84 moves from the minimum object distance side to the infinity side and an initial position of the distance measurement area 153 is the position of the distance measurement area 153C, the distance measurement area 153 sequentially changes in the order of the distance measurement area 153C, the distance measurement area 153B, and the distance measurement area 153A. Meanwhile, in a case where the focus lens 84 moves from the infinity side to the minimum object distance side and the initial position of the distance measurement area 153 is the position of the distance measurement area 153A, the distance measurement area 153 sequentially changes in the order of the distance measurement area 153A, the distance measurement area 153B, and the distance measurement area 153C. In the present embodiment, the contrast values are acquired for all the distance measurement areas 152 shown in FIG. 19.

In the next step S112A, the CPU 74 adds the contrast values of the distance measurement areas 152 selected in step S111A. Specifically, the contrast values of the selected distance measurement areas 152 are added for each captured image 150 captured at each position of the focus lens 84 moved during the peak detection operation. Thus, the distance measurement area 152 to be selected is different and the distance measurement area 153 is different for each captured image 150.

As described above, in the present embodiment, in a case where the addition area distance measurement is performed, the positions of the distance measurement areas 152 to be added sequentially change according to the amount of change of the image position during the peak detection operation. In other words, the position of the distance measurement area 153 sequentially changes. Thus, the image 154 of the subject can be appropriately included within the distance measurement area 153. Accordingly, according to the imaging device 10 of the present embodiment, even though the image position changes according to the change of the image magnification of the focus lens 84, it is possible to further improve the specification accuracy of the focusing position.

The method of setting the position of the distance measurement area 153 (the distance measurement area 152 to be selected) immediately after the addition area distance measurement is started is not particularly limited, but it is preferable that the user can set this position.

As described above, the imaging device 10 according to each of the aforementioned embodiments comprises the imaging lens 14 including the focus lens 84, the focus lens drive unit 90 that moves the position of the focus lens 84 along the optical axis direction, the CPU 74, and the main body side main controller 46 including the secondary storage unit 78 that stores the focusing control program 79.

The CPU 74 functions as the input unit to which the captured image obtained by imaging an optical image passed through the imaging lens 14 is input, the processing unit, and the controller by executing the focusing control program 79. The processing unit performs any one of the multi-point distance measurement which is the first processing or the addition area distance measurement which is the second processing. The multi-point distance measurement is processing of deriving the contrast value of the image of the subject within the distance measurement area 152 that changes according to the movement of the focus lens 84 due to the focus lens drive unit 90 for each of the plurality of distance measurement areas 152 (152A to 152I), specifying the peak of the contrast value based on the contrast value for each of the plurality of distance measurement areas 152, and specifying, as the focusing position, the position of the focus lens 84 corresponding to the specified peak of the contrast value. The addition area distance measurement is processing of specifying the peak of the contrast value based on the added value obtained by adding the contrast values derived from the plurality of distance measurement areas 152 and specifying, as the focusing position, the position of the focus lens 84 corresponding to the specified peak of the contrast value. The controller performs control the one processing is switched according to the amount of change D of the image position corresponding to the change of the image magnification of the imaging lens 14. The focus lens drive unit 90 moves the focus lens to the focusing position specified by the processing unit.

Accordingly, according to the imaging device 10 of each of the aforementioned embodiments, since any one processing of the multi-point distance measurement or the addition area distance measurement is performed according to the amount of change of the image position, even though the image position changes according to the change of the image magnification of the focus lens 84, it is possible to further improve the specification accuracy of the focusing position.

Although it has been described in each of the aforementioned embodiments that the imaging device 10 functions as a focusing control device of the present disclosure, the present invention is not limited to each of the above-described embodiments. For example, the imaging lens 14 may function as the focusing control device. In this case, the lens side main controller 86 may operate instead of the main body side main controller 46 in each of the aforementioned embodiments, and the CPU 98 instead of the CPU 74 may operate as the input unit, the processing unit, and the controller.

Although it has been described in each of the aforementioned embodiments that in a case where the addition area distance measurement is performed, the added value obtained by adding the contrast values of the distance measurement areas 152 is used, the present invention is not limited to each of the aforementioned embodiments, and for example, an average value divided by the number of distance measurement areas 152 to which the added value is added may be used.

Figure 21:
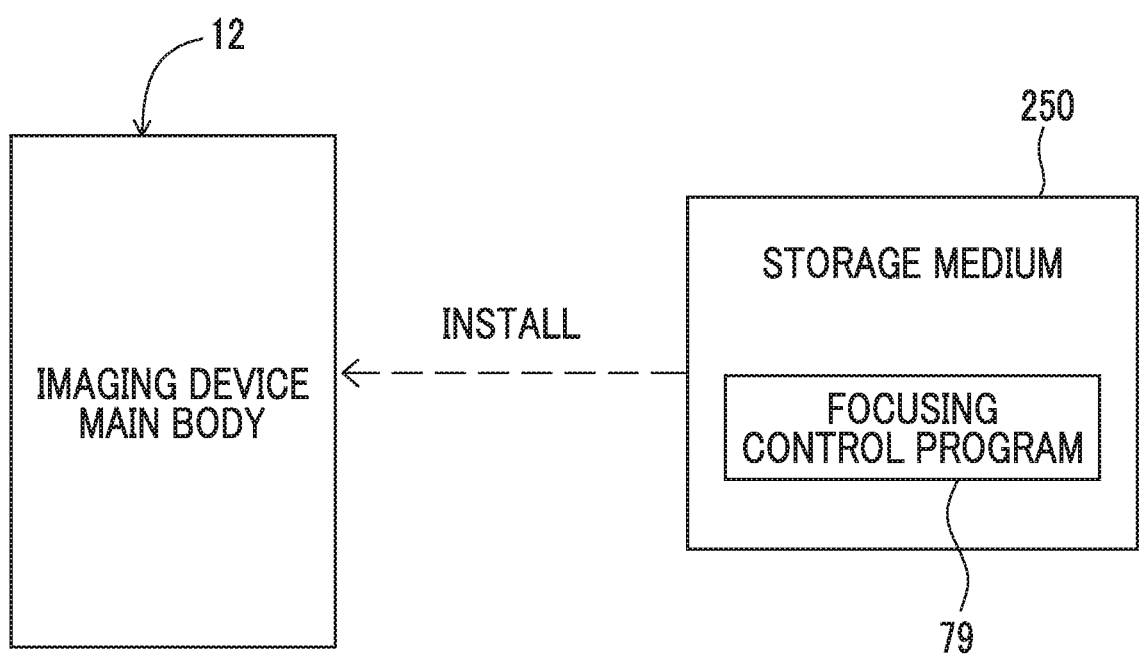
FIG. 21 is a conceptual diagram showing an example of an aspect in which a focusing control program is installed on the imaging device main body from a storage medium in which the focusing control program of the embodiment is stored.

Although it has been described in each of the aforementioned embodiments that the focusing control program 79 is read out from the secondary storage unit 78, it is not necessary to store the focusing control program in the secondary storage unit 78 from the beginning. For example, as shown in FIG. 21, the focusing control program 79 may be first stored in any portable storage medium 250 such as a solid state drive (SSD), a Universal Serial Bus (USB) memory, or a compact disc read only memory (CD-ROM). In this case, the focusing control program 79 of the storage medium 250 is installed on the imaging device main body 12, and the installed focusing control program 79 is executed by the CPU 74.

The focusing control program 79 may be stored in a storage unit such as another computer or a server device connected to the imaging device main body 12 via a communication network (not shown), and the focusing control program 79 may be downloaded according to a request of the imaging device main body 12. In this case, the downloaded focusing control program 79 is executed by the CPU 74.

The focusing control processing described in each of the aforementioned embodiments is merely an example. Accordingly, unnecessary steps may be deleted, new steps may be added, or the processing order may be changed without departing from the gist.

Although it has been described in the aforementioned embodiments that the focusing control processing is realized by a software configuration using a computer, the technology of the present disclosure is not limited thereto. For example, instead of the software configuration using the computer, the focusing control processing may be executed only by a hardware configuration such as a field-programmable gate array (FPGA) or an application specific integrated circuit (ASIC). The focusing control processing may be executed by a configuration in which the software configuration and the hardware configuration are combined.

More specifically, the following various processors can be used as hardware resources that execute the focusing control processing described in the aforementioned embodiments. Examples of the processor include a CPU which is a general-purpose processor functioning as the hardware resource that executes the focusing control processing by executing software, that is, a program as described above. Examples of the processor include a dedicated electric circuit which is a processor having a circuit configuration specifically designed for executing specific processing such as an FPGA, a programmable logic device (PLD), or an ASIC.

The hardware resource that executes the focusing control processing may be one of these various processors, or may be a combination (for example, a combination of a plurality of FPGAs or a combination of a CPU and an FPGA) of two or more processors of the same type or different types. The hardware resource that executes various kinds of processing according to the technology of the present disclosure may be one processor.

As an example in which one processor is used, firstly, as represented by a computer such as a client and a server, one processor is used by a combination of one or more CPUs and software, and this processor functions as the hardware resource that executes the focusing control processing. Secondly, as represented by system-on-a-chip (SoC), a processor that realizes functions of the entire system including a plurality of hardware resources for executing the focusing control processing by one IC chip is used. As described above, the focusing control processing is realized by using one or more of the various processors as the hardware resources.

As a hardware structure of these various processors, more specifically, an electric circuit in which circuit elements such as semiconductor elements are combined can be used.

From the above description, the invention described in the following Appendix 1 can be grasped.

APPENDIX 1

There is provided a focusing control device comprising an input unit that receives an input of a captured image obtained by imaging an optical image passed through an imaging lens including a focus lens, a movement unit that moves a position of the focus lens along an optical axis direction, a processing unit that performs any one processing of first processing of deriving a contrast value of an image within a distance measurement area which changes according to the movement of the position of the focus lens by the movement unit for each of a plurality of the distance measurement areas, specifying a peak of the contrast value based on the contrast value for each of the plurality of distance measurement areas, and specifying, as a focusing position, the position of the focus lens corresponding to the specified peak of the contrast value, or second processing of specifying the peak of the contrast value based on an added value obtained by adding the contrast values derived from the plurality of distance measurement areas and specifying, as the focusing position, the position of the focus lens corresponding to the specified peak of the contrast value, and a controller that performs control such that the one processing to be executed by the processing unit is switched according to an amount of change of a position of an image of a subject corresponding to a change of an image magnification of the imaging lens. The movement unit moves the focus lens to the focusing position specified by the processing unit.

In the present specification, "A and/or B" has the same meaning as "at least one of A or B". That is, "A and/or B" means that only A may be used, only B may be used, or a combination of A and B may be used. In the present specification, the same concept as "A and/or B" is also applied to a case where three or more matters are expressed by "and/or".

This application claims the priority of Japanese Patent Application No. 2018-068990 filed on Mar. 30, 2018, the entire content of which is incorporated herein by reference. All the documents, patent applications, and technical standards described in the present specification are incorporated in the present specification by reference to the same extent as a case where individual documents, patent applications, and technical standards are specifically and individually noted to be incorporated by reference.

What is claimed is:

1. A focusing control device that moves a position of a focus lens included in an imaging lens along an optical axis direction, the device comprising:
  a processor configured to execute a process comprising:
  receiving an input of a captured image obtained by imaging an optical image passed through the imaging lens including the focus lens;
  performing one processing of first processing that includes deriving a contrast value of an image within a distance measurement area which changes according to the movement of the position of the focus lens for each of a plurality of the distance measurement areas, specifying a peak of the contrast value based on the contrast value for each of the plurality of distance measurement areas, and specifying, as a focusing position, the position of the focus lens corresponding to the specified peak of the contrast value, or second processing that includes specifying the peak of the contrast value based on an added value obtained by adding the contrast values derived from the plurality of distance measurement areas and specifying, as the focusing position, the position of the focus lens corresponding to the specified peak of the contrast value;
  performing control such that the one processing is switched according to an amount of change of a position of an image of a subject corresponding to a change of an image magnification of the imaging lens, and moving the focus lens to the specified focusing position.

2. The focusing control device according to claim 1, wherein the processor derives the amount of change of the position of the image of the subject based on an amount of change of the image magnification, a position of the distance measurement area in the captured image, and a movement range of the focus lens that detects the peak.

3. The focusing control device according to claim 1, wherein, in a case in which the second processing is performed, the processor decides the distance measurement areas to which the contrast value is added among the plurality of distance measurement areas based on an amount of change of the image magnification.

4. The focusing control device according to claim 1, wherein the processor performs movement processing of moving a position of the distance measurement area according to the change of the image position of the subject included in the distance measurement area.

5. The focusing control device according to claim 4, wherein the process further comprises giving an instruction to execute the movement processing, and wherein, in a case in which the movement processing is executed according to the instruction, the processor performs the first processing.

6. The focusing control device according to claim 5, wherein the processor gives the instruction to execute the movement processing according to at least one of an expected processing time expected to be required for the movement processing or a frame rate of the captured image.

7. The focusing control device according to claim 6, wherein, in a case in which the movement processing is executed according to the instruction, the processor derives the amount of change of the position of the image of the subject in an expected processing time expected to be required for deriving the changed position of the image of the subject.

8. The focusing control device according to claim 1, wherein the processor performs control such that the one processing is switched after the focus lens is moved in order to detect a change of the peak of the contrast value.

9. A focusing control method of a focusing control device that moves a position of a focus lens included in an imaging lens along an optical axis direction, the method comprising:
receiving an input of a captured image obtained by imaging an optical image passed through the imaging lens;
performing one processing of first processing that includes deriving a contrast value of an image within a distance measurement area which changes according to the movement of the position of the focus lens for each of a plurality of the distance measurement areas, specifying a peak of the contrast value based on the contrast value for each of the plurality of distance measurement areas, and specifying, as a focusing position, the position of the focus lens corresponding to the specified peak of the contrast value, or second processing that includes specifying the peak of the contrast value based on an added value obtained by adding the contrast values derived from the plurality of distance measurement areas and specifying, as the focusing position, the position of the focus lens corresponding to the specified peak of the contrast value;
performing control such that the one processing is switched according to an amount of change of a position of an image of a subject corresponding to a change of an image magnification of the imaging lens; and
moving the focus lens to the specified focusing position.

10. A non-transitory computer-readable storage medium storing a program causing a computer that controls a focusing control device that moves a position of a focus lens included in an imaging lens along an optical axis direction to execute a process, the process comprising:
receiving an input of a captured image obtained by imaging an optical image passed through the imaging lens;
performing one processing of first processing that includes deriving a contrast value of an image within a distance measurement area which changes according to the movement of the position of the focus lens for each of a plurality of the distance measurement areas, specifying a peak of the contrast value based on the contrast value for each of the plurality of distance measurement areas, and specifying, as a focusing position, the position of the focus lens corresponding to the specified peak of the contrast value, or second processing that includes specifying the peak of the contrast value based on an added value obtained by adding the contrast values derived from the plurality of distance measurement areas and specifying, as the focusing position, the position of the focus lens corresponding to the specified peak of the contrast value;
performing control such that the one processing is switched according to an amount of change of a position of an image of a subject corresponding to a change of an image magnification of the imaging lens; and
moving the focus lens to the specified focusing position.

* * * * *